(12) United States Patent
Aleem et al.

(10) Patent No.: US 11,475,592 B2
(45) Date of Patent: Oct. 18, 2022

(54) SYSTEMS AND METHODS FOR DETERMINING AN EAR SADDLE POINT OF A USER TO PRODUCE SPECIFICATIONS TO FIT A WEARABLE APPARATUS TO THE USER'S HEAD

(71) Applicant: GOOGLE LLC, Mountain View, CA (US)

(72) Inventors: Idris Aleem, Kitchener (CA); Mayank Bhargava, Waterloo (CA); Rees Simmons, Kitchener (CA)

(73) Assignee: Google LLC, Mountain View, CA (US)

(*) Notice: Subject to any disclaimer, the term of this patent is extended or adjusted under 35 U.S.C. 154(b) by 361 days.

(21) Appl. No.: 16/787,298

(22) Filed: Feb. 11, 2020

(65) Prior Publication Data
US 2020/0258255 A1 Aug. 13, 2020

Related U.S. Application Data

(60) Provisional application No. 62/804,522, filed on Feb. 12, 2019.

(51) Int. Cl.
*G06T 7/73* (2017.01)
*G06T 7/536* (2017.01)
(Continued)

(52) U.S. Cl.
CPC .......... *G06T 7/75* (2017.01); *G06T 7/50* (2017.01); *G06T 7/536* (2017.01); *G06T 17/00* (2013.01); *G06T 17/20* (2013.01); *G06T 17/205* (2013.01); *G06T 2207/20021* (2013.01); *G06T 2207/20084* (2013.01); *G06T 2207/30196* (2013.01); *G06T 2210/12* (2013.01)

(58) Field of Classification Search
CPC .. G06T 7/75; G06T 7/50; G06T 7/536; G06T 17/00; G06T 17/20; G06T 17/205; G06T 2207/20021; G06T 2207/20084; G06T 2207/30196; G06T 2210/12; G06T 19/20; G06T 2207/20081; G06T 2207/30201; G06T 2219/2004
See application file for complete search history.

(56) References Cited

U.S. PATENT DOCUMENTS

| | | | | |
|---|---|---|---|---|
| 2014/0218679 A1* | 8/2014 | Haddadi | ............... | G02C 13/005 351/204 |
| 2016/0299360 A1* | 10/2016 | Fonte | ..................... | B29D 12/02 |
| 2020/0138141 A1* | 5/2020 | Kwok | ..................... | A42B 3/125 |

\* cited by examiner

*Primary Examiner* — Christopher M Brandt

(57) ABSTRACT

An ear saddle point of a subject's ear is determined to produce specifications to fit a wearable apparatus to a subject's head. A boundary of the subject's ear in a profile image is determined using a first model. A map of the subject's ear is generated indicating probable locations of a two-dimensional ear saddle point. A most probable location of the two-dimensional ear saddle point is determined based on the probability map. The two-dimensional ear saddle point is projected onto a three-dimensional mesh surface representing the subject's head. A maximum depth of the three-dimensional mesh surface is determined in a defined region around the projected two-dimensional ear saddle point. The ear saddle point is computed based on the projected two-dimensional ear saddle point and the determined maximum depth. Specifications of a wearable apparatus are generated to fit the apparatus to the subject's head based on the computed ear saddle point.

16 Claims, 16 Drawing Sheets

(51) Int. Cl.
*G06T 17/20* (2006.01)
*G06T 7/50* (2017.01)
*G06T 17/00* (2006.01)

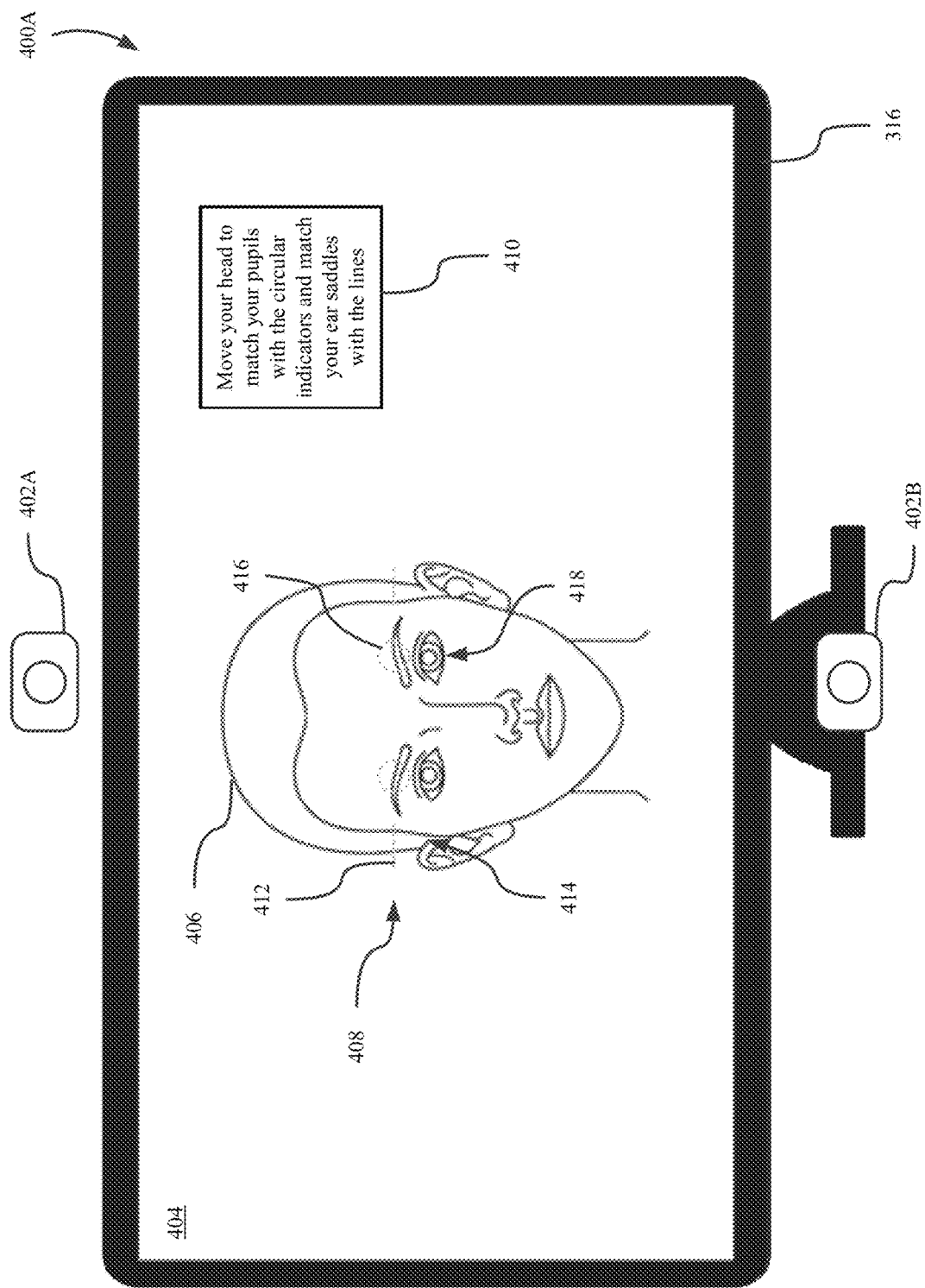

SYSTEMS AND METHODS FOR DETERMINING AN EAR SADDLE POINT OF A USER TO PRODUCE SPECIFICATIONS TO FIT A WEARABLE APPARATUS TO THE USER'S HEAD

CROSS-REFERENCE TO RELATED APPLICATIONS

This application claims the benefit of U.S. Provisional Application No. 62/804,522, filed Feb. 12, 2019, titled "Systems and Methods for Determining an Ear Saddle Point of a User to Produce Specifications to Fit a Wearable Apparatus to the User's Head", the content of which is incorporated herein in its entirety by reference.

TECHNICAL FIELD

The present disclosure relates to methods and systems for determining an ear saddle point of a particular user to fit a wearable heads-up display system to the head of the user.

BACKGROUND

Description of the Related Art

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment.

A challenge in the design of at least some wearable heads-up displays is to provide a fit for the heads-up display that is customized to the user. Some wearable heads-up displays are manufactured only in a single universal design having a uniform size and style intended to accommodate all users. Users may be reluctant to wear heads-up displays of this universal design because they are bulky, appear clumsy or inelegant, and may not be suitable for a particular user's style preferences. However, due to technological constraints associated with heads-up displays, providing a heads-up display that is customized for the particular features of a user's head and face and that aligns with a user's particular style preferences remains a challenging and complex problem.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 3 front elevation view of a portion of the system of FIG. 2 at a first time during an operation to capture imaging data of a head of a subject according to one or more implementations.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising"

is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

The various embodiments described herein provide systems, devices, and methods for determining an ear saddle point of a particular user to fit scanning laser-based wearable heads-up displays ("WHUDs") to the head of the user. Generally, a scanning laser-based WHUD is a form of virtual retina display in which a scanning laser projector ("SLP") draws a raster scan onto the eye of the user.

Figure 1:
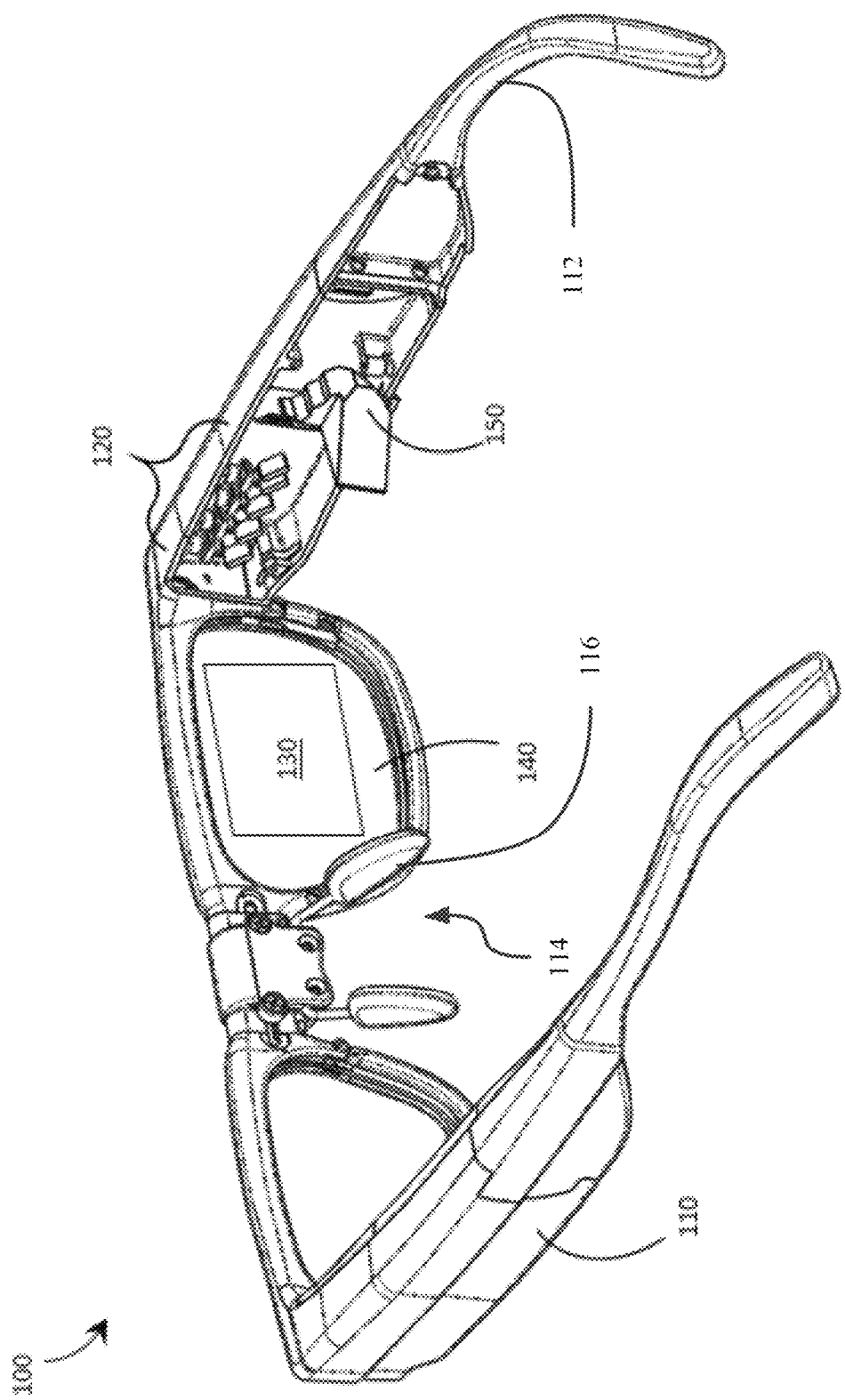
FIG. 1 is a partial-cutaway perspective view of a wearable heads-up display according to one or more implementations.

FIG. 1 is a partial-cutaway perspective view of an exemplary WHUD 100. WHUD 100 includes a support structure 110 that in use is worn on the head of a user and has a general shape and appearance of an eyeglasses (e.g., sunglasses) frame. In particular, the WHUD 100 has an appearance similar or identical to styles and shapes of at least some eyeglasses. Support structure 110 carries multiple components, including: a SLP 120, a holographic combiner 130, and an optical splitter 150. Portions of SLP 120 and optical splitter 150 may be contained within an inner volume of support structure 110; however, FIG. 1 provides a partial-cutaway view in which regions of support structure 110 have been removed in order to render visible portions of SLP 120 and optical splitter 150 that may otherwise be concealed. The support structure 110 includes a pair of temple support portions 112 for supporting the WHUD 100 on ear saddles of a person's head and a bridge 114 for supporting the WHUD 110 on a person's nose. The bridge 114 may comprise a pair of opposing nose pads 116 or may be a single monolithic structure for resting on the nose.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, and/or supported by, with or without any number of intermediary physical objects there between.

SLP 120 may include multiple laser diodes (e.g., a red laser diode, a green laser diode, and/or a blue laser diode) and at least one scan mirror (e.g., a single two-dimensional scan mirror or two one-dimensional scan mirrors, which may be, e.g., MEMS-based or piezo-based). SLP 120 may be communicatively coupled to (and support structure 110 may further carry) a processor and a non-transitory processor-readable storage medium or memory storing processor-executable data and/or instructions that, when executed by the processor, cause the processor to control the operation of SLP 120. For ease of illustration, FIG. 1 does not call out a processor or a memory.

Holographic combiner 130 is positioned within a field of view of at least one eye of the user when support structure 110 is worn on the head of the user. Holographic combiner 130 is sufficiently optically transparent to permit light from the user's environment (i.e., "environmental light") to pass through to the user's eye. In the illustrated example of FIG. 1, support structure 110 further carries a transparent eyeglass lens 140 (e.g., a prescription eyeglass lens) and holographic combiner 130 comprises at least one layer of holographic material that is adhered to, affixed to, laminated with, carried in or upon, or otherwise integrated with eyeglass lens 140. The at least one layer of holographic material may include a photopolymer film such as Bayfol® HX available from Bayer MaterialScience AG or a silver halide compound and may, for example, be integrated with transparent lens 140. Holographic combiner 130 includes at least one hologram in or on the at least one layer of holographic material. With holographic combiner 130 positioned in a field of view of an eye of the user when support structure 110 is worn on the head of the user, the at least one hologram of holographic combiner 130 is positioned and oriented to redirect light originating from SLP 120 towards the eye of the user. In particular, the at least one hologram is positioned and oriented to receive light signals that originate from SLP 120 and converge those light signals to at least one exit pupil at or proximate the eye of the user.

Optical splitter 150 is positioned in an optical path between SLP 120 and holographic combiner 130. Optical splitter 150 comprises at least one optical element (e.g., at least one lens, reflector, partial reflector, prism, diffractor, diffraction grating, mirror, or other optical element, or at least one configuration, combination, and/or arrangement of such) that is arranged to receive light signals generated and output by SLP 120 and redirect each such light signal towards holographic combiner 130 effectively from one of multiple (e.g., N, where N is an integer greater than 1) spatially-separated "virtual positions" for SLP 120. Advantageously, optical splitter 150 may be a static and passive component that, without power consumption or any moving parts, receives (at a first point of incidence therein or thereon) a first light signal generated by SLP 120 and routes/redirects the first light signal along an optical path towards holographic combiner 130 that traces back to (if optical splitter 150 is ignored during trace back) one of N spatially-separated virtual positions for SLP 120. The particular one of the N spatially-separated virtual positions for SLP 120 from which the first light signal is redirected by optical splitter 150 is determined by the first point of incidence at which the first light signal is received by optical splitter 150. In other words, from the point of view of holographic combiner 130, optical splitter 150 causes at least some light signals generated by SLP 120 to appear to originate (i.e., "effectively" originate) from N spatially-separated "virtual positions" for SLP 120 as opposed to from the real position for SLP 120.

Throughout this specification and the appended claims, reference is often made to one or more "virtual position(s)" such as "N spatially-separated virtual positions for a SLP." The "real position" of an object is its actual position in real, three dimensional space. A "virtual position" of an object is a position in real space at which the optics of a system cause light from the object to effectively originate even though the real position of the object may be elsewhere. In other words, the optics of the system cause light from the object to follow optical paths that would trace back, if the optics of the system were ignored during the trace back, to a "virtual position" in space that is spatially-separated from the object's "real position" in space. As a simple example, an object in front of a planar mirror has a "virtual position" on the other side of the planar mirror. A "virtual position" may be a result of one or more intervening optical element(s) in an optical path. When one or more optical element(s) redirects light signals from a SLP, a virtual position for the SLP refers to the position in real space at which the SLP would need to be located in order to provide light signals having that same trajectory without any intervening optics. The optics of the system cause the light signals to follow a trajectory that would correspond to a different point of origin if there were no such optics in the system. The light signals appear to have "effectively" originated from a different, or "virtual," position for the SLP.

Figure 2:
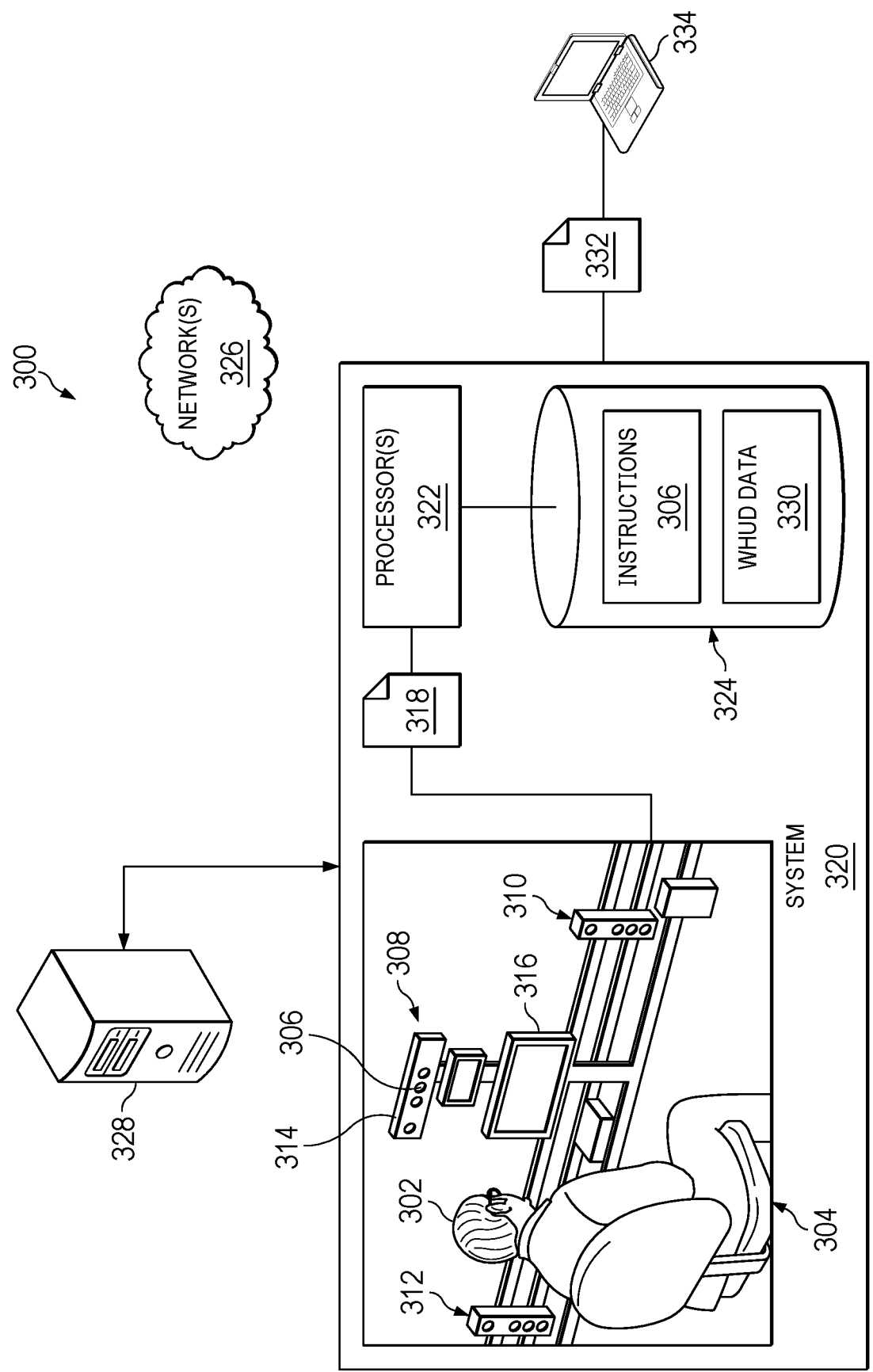
FIG. 2 is a schematic diagram of a system for fitting a wearable heads-up display to a subject according to one or more implementations.

FIG. 2 is an environment 300 for automatically determining a fit of a WHUD 100 to a head 302 of a subject according to one or more implementations. In the illustrated implementation, the environment 300 includes a plurality of cameras 306 positioned around a location 304 where a subject 304 is to be located for capturing imaging data 318 of the head 302. Other implementations may employ a single camera in a fixed position, or a single displaceable camera, e.g., carried by one or more movable fixtures. The plurality of cameras 306 are positioned in different locations around the location 304 to capture imaging data 318 including information representative of different portions of the head 302. A first set 308 of the cameras 306 is positioned in front of the location 304, a second set 310 of the cameras 306 is located on a first side of the location 304, and a third set 312 of cameras 312 is located on a second side of the location 304 opposite to the first side. Each of the first set 308, the second set 310, and the third set 312 of the cameras 306 may be housed within a respective camera subsystem 314 positioned on the front or sides of the location 304. The camera subsystems 314 may include controllers that interact with the cameras 306 to perform image capturing operations described herein. The cameras 306 may include one or more infrared camera(s) and the camera subsystems 314 may include one or more infrared light sources, such as one or more infrared speckle projector(s). The illustrated implementation of environment 300 also includes a display 316 positioned in front of the location 304. The display 316 is an example of a mechanism that provides feedback and/or instructions to guide the subject through a process of obtaining the imaging data 318. The environment 300 may include indicators that are operable to indicate a point at which the subject should gaze during the capture of imaging data 318. The environment 300 may further include speakers for providing audio to facilitate the capture of imaging data 318, e.g., by providing audio indicating when one or more of the cameras 306 will capture imaging data 318.

The environment 300 includes a processor-based system 320 including one or more processors 322 and memory 324 storing a set of instructions 326 that, as a result of execution by the one or more processors 322, cause the system 320 to perform the operations described herein. The memory 324 includes one or more types of data storage, such as read-only memory, random access memory, solid state memory, redundant array of independent disks (RAID), optical discs, cache memory, and magnetic tape memory, by way of non-limiting example. The system 320 is electronically communicatively coupled with the memory 324 via hard connections, such as one or more system buses. The one or more processors 322 are also electronically communicatively coupled with the cameras 306 to cause the cameras 306 to capture the imaging data 318. The one or more processors 320 are also electronically communicatively coupled with the display 316 and cause the display 316 to present instructions to the subject and/or information guiding the subject to facilitate the system 320 to obtain imaging data 318 appropriate to determine a fit of the WHUD 100. The system 320 may be communicatively electronically coupled to the indicators and/or speakers in the environment, which the system 320 may control to facilitate capture of the imaging data 318.

The imaging data 318 may include data for a plurality of imaging events taken at a plurality of different times. Each of the imaging events corresponds to a plurality of images taken by a plurality of the cameras 306 at the same time. The plurality of images taken at the same time may be used to construct a model (e.g., a 3D model) of the subject's head 302, including the subject's eyes, while the subject is gazing at a particular point.

The imaging data 318 is used to determine the fit of the WHUD 100 according to one or more implementations. In some implementations, the system 320 may process the imaging data 318 via the one or more processors 322 to perform one or more operations for determining the fit of a WHUD 100 to a subject, as described herein. In some implementations, the system 320 may provide the imaging data 318 over a network 326 to a remote system 328 at a location remote to the system 320. The system 320 may include one or more communication interfaces (not pictured) for facilitating wired and/or wireless communication with other devices. Examples of such communication interfaces include network adapters, Wi-Fi transceivers, fiber optic transceivers, and the like. The network 326 may be private (e.g., secured or unsecured local area networks, cellular networks, serial connection) or public (e.g., the Internet, mesh networks, wide area networks). The remote system 328 includes one or more processor-based devices, such as Web servers, that process the imaging data 318 to perform one or more operations for determining the fit of a WHUD 100 to a subject.

Determining the fit of a WHUD 100 to a subject involves performance of a set of operations including generating, using the imaging data 318 obtained, a plurality of models of at least a portion of the subject's head 302. The set of operations also include recognizing features of the subject's head 302 using one or more of the plurality of models and/or one or more of the two-dimensional images captured by the camera(s). The operations also include generating a simulation of the head 302 and simulations of different configurations or models of the WHUD 100 and/or components thereof relative to the simulation of the head 302. WHUD data 330 is stored in the memory 324 may include data regarding the size and shape of components of WHUDs 100 (e.g., dimensions of temple support portions 112, dimensions of front frame of support structure 110, dimensions of bridge 114). The WHUD data 330 may include information regarding the optics of optical components (e.g., SLP 120, holographic combiner 130, optical splitter 150) for simulating generation of the exit pupils 200 with corresponding configurations of a WHUD 100. Simulations of the WHUDs 100 may be generated based at least in part on the WHUD data 330, as described herein. Based at least in part on the simulations of the WHUD(s) 100 relative to the simulation of the head 302, the set of operations include determining a model or configuration of a WHUD 100 that is an appropriate fit for the subject's head 302. An appropriate fit is determined as a fit of the WHUD 100 to the subject's head 302 in which the exit pupils 200 are aligned with the entrance pupil of the subject's eye 202 when the temple support portions 112 of the support structure 110 are supported by the subject's ear saddles and the bridge 114 is supported by the subject's nose.

As a result of determining a fit of a WHUD 100 to the subject's head 302, the system 320 may generate WHUD configuration information 332 regarding one or more configurations of the WHUD 100 that are a fit for the subject. For instance, the WHUD configuration information 330 may specify one or more configurations of WHUDs 100 that would be an appropriate fit for the subject's head 302. The configurations may specify sets of components that could be combined to form a WHUD 100 that would be an appropriate fit for the subject's head 302. The configuration information 330 may specify models of the WHUD 100 that would be an appropriate fit for the subject's head 302. The configuration information 330 may also specify modifications for WHUD 100 models or components that would provide an appropriate fit of the WHUD 100 for the subject's head 302, including without limitation recommendations for post-manufacturing adjustments to, for example, the nose pads and/or temple arms (i.e., over and behind the ear) of the WHUD 100. The set of operations for determining the fit may also include optimizing the fit of the WHUD 100 to the subject's head 302, such as by determining a "best fit" model or configuration of a WHUD 100 and/or modifications to components of the WHUD 100 that would improve the comfort or performance of the WHUD 100 for the subject. Information representative of such optimizations may be included in the WHUD configuration information 332. The WHUD configuration information 332 may be generated and provided to a user device 334 over the network 326. The user device 334 is a processor-based device associated with an entity, such as an employee or supervisor, authorized to facilitate determining a fit of the WHUD 100 to the subject's head 302. The configuration information, in some implementations, may be presented to the subject, e.g., via the display 316 or to an account associated with the subject. Based on the configuration information 332, a configuration for a WHUD 100 may be selected for the subject.

FIG. 3 shows a process implemented by the system 320 to guide a subject through obtaining the imaging data 318. The process for obtaining the imaging data 318 involves providing instructions to the subject on the display 316 and capturing the imaging data 318 via at least some of the cameras 306. FIG. 3 shows an environment 400A including the display 316 and one or more indicators 402 positioned around the display 316. The indicators 402 include lights, such as light-emitting diodes, that indicate a location to which the subject should direct their gaze for the cameras 306 to capture imaging data 318. There may be a separate indicator 402 for each imaging event, which may comprise imaging data taken by a plurality of the cameras 306 at the same time, as described above. In the environment 400, a first indicator 402A is positioned above a display screen 404 of the display 316 and a second indicator 402B positioned below the display screen 404. There may be more than two indicators 402 in some implementations—for example, there may be two or more first indicators 402A each positioned at predetermined locations above the display screen 404 and/or there may be two or more second indicators 402B each positioned at predetermined locations below the display screen 402B. In some implementations, one or more of the indicators 402 may be part of one or more camera subsystems 314. In some implementations, one or more of the indicators 402 may be implemented by displaying an indication of a point at which the subject should gaze. In some implementations, the indicators 402 may be displayed by the display 316, or may be part of or attached to the display 316. In some implementations, the gaze point may be at a location on the subject's face, e.g., near the subject's eyes. In such a case, the gaze point may not be indicated by the display, because it is likely that the subject will naturally be looking at their face as they try to align themselves appropriately.

The display screen 404 in the environment 400A is displaying an image 406 of the subject's head 302 and an overlay for guiding the subject to position their head 302 to capture the imaging data 318. The image 406 is an image captured by one of the cameras 306 in front of the subject, such as a camera 306 in the first set of cameras 308, and displayed in real-time to the subject. The overlay 408 is a set of images superimposed over the image 406 of the subject and positioned in a fixed location in the display screen 404. The overlay 404 helps the subject to position their head 302 in a correct orientation and location relative to the cameras 306 to capture imaging data 318 for modeling the subject's head 302. A position of the overlay 408 in the display screen 404 may be determined based on, for example, positions of the cameras 306 relative to the display screen 404.

The overlay 408 includes a pair of first portions 412 for guiding the subject to position ear saddles 414 of the image 406 of the subject's head 302 to desired locations within the display screen 404. The first portions 412 in the illustrated exemplary environment 400A are straight lines extending in a generally horizontal direction relative to the center of the screen 404, although the first portions 412 may have a different appearance in some implementations. For instance, the first portions 412 may have the appearance of left and right temple arms of eyeglasses. In some implementations, the first portions 412 may have the shape of left and right ears for aligning with left and right ears of the subject's head 302.

The overlay 408 also includes a pair of second portions 416 for guiding the subject to position pupils of the image 406 of the subject's head 302 to particular locations within the display screen 404. The second portions 416 in the exemplary illustrated environment 400A respectively have an annular shape corresponding to the circular shape of the subject's pupils. The second portions 416 may have a different appearance in some implementations, such as having the appearance of irises of the eye or the appearance of eyeglass lenses that encompass the eye. The exemplary illustrated second portions 416 each have a size and shape (e.g., diameter) corresponding to the size and shape that the subject's pupils will appear to have when the subject is located at the location 304. That is, respective ones of the subject's pupils will be within corresponding second portions 416 when the subject is located at a distance away from the screen 404 and the subject's head 302 is appropriately oriented. The subject may adjust their posture, seat height, head 302 orientation, etc., to align the first portions 412 and the second portions 416 respectively with the ear saddles 414 and the pupils 418 of the image 406. In some implementations, the seat upon which the subject sits may automatically adjust its height to align the user without requiring the user to make such adjustments manually.

The overlay 408 may have appearances other than those shown or described. For instance, in some implementations, the overlay 408 may have the appearance of a pair of eyeglasses that the subject appropriately aligns with corresponding portions of their image 406. In some implementations, the screen 404 may be darkened or out-of-focus in parts other than the overlay 408 such that the subject aligns their pupils and ears or pupils and ear saddles with the in-focus or normal portions of the overlay 408.

A configuration of the overlay 408 may be determined based on data stored in the memory 324. For instance, the size, spacing, and appearance of the first portions 412 and the second portions 416 may be determined based on overlay configuration information stored in the memory 324. The overlay configuration information may, for instance, specify sizing of and/or spacing between the first portions 412, sizing of and/or spacing between the second portions 416, and spacing between the first portions 412 and the second portions 416. Such overlay configuration information may be stored as relative or absolute coordinates on the display 404. In some implementations, the instructions 306 may include executable instructions executable by the one or more processors 322 to recognize various features of the subject's head 302, such as eyes, irises, pupils, ears, ear saddles, nose, and eyelashes. In at least some of those implementations, the system 320 may determine the sizing and spacing of the first and second portions 412 and 416 based at least on corresponding spacing and sizing of corresponding facial features recognized for the subject's head 302.

The screen 404 may also display instructions 410A instructing the subject on how to position their head 302 relative to the overlay 408. The instructions 410A may be textual or may comprise one or more images illustrating the desired position of the image 406 relative to the overlay 408. For instance, the instructions 410A instruct the subject to match their ear saddles and pupils with corresponding portions of the overlay 408.

As a result of the set of conditions being satisfied for aligning the features of the subject's head 302 with the corresponding portions of the overlay 408, the system 320 may proceed to capture the imaging data 318. The system 320 may make a determination that the set of conditions for alignment are satisfied based on an automatic basis and/or by manual input. The system 320 may automatically begin obtaining imaging data 318 and as a result detect that the subject's ear saddles 414 and pupils 418 are respectively aligned with the first portions 412 and the second portions 416. In some implementations, the system 320 may receive a manual input, such as a selection on an input device, provided, for example, by an assistant or employee tasked with overseeing the image capturing process.

As a result of satisfying the set of conditions for aligning the features of the subject's head 302 with the corresponding portions of the overlay 408, the system 320 captures the imaging data 318 of the subject's head 302 in a plurality of imaging events. In each of the imaging events, the subject gazes at a different location with their eyes while keeping their head 302 in a position in which the ear saddles 414 and the pupils 418 are respectively aligned with the first portion 412 and the second portion 416 of the overlay 408. The system 320 may activate various ones of the indicators 402 or implement other visual cues for the subject to fix their gaze during the imaging events.

As a result of capturing one or more sets of imaging data 318, the system 320 proceeds to generate one or more three-dimensional models of the subject's head 302. The three-dimensional models generated represent portions of the subject's head 302, including the subject's face and ears, to use for detecting certain features of the subject's head 302. In some implementations, the models are generated by the system 320 using the imaging data 318. In some implementations, the system 320 may provide the imaging data 318 to the remote system 328, which generates the one or more three-dimensional models and sends the models generated back to the system 320. The system 320 and/or remote system 328 may generate the models by using a plurality of processors in parallel to speed up the process and/or offload work. For instance, one set of processors may generate a first model while a second set of processors generates a second model. In some implementations, the system 320 may send two or more sets of the imaging data 318 to the remote system 328, which implements parallel processing to generate and provide a model for each set of the imaging data 318 to the system 320.

The system 320 (or remote system 328) may analyze the different models generated to detect certain features of the subject's head 302. The in-plane model may be used to detect four points in the model: pupil centers of the left and right eyes, and ear saddle points of the left and right ears. By detecting the pupil centers and ear saddle points, the system 320 can define a glasses plane passing through the four points. In some implementations, it may be sufficient for the system 320 to detect the pupil centers and one of the left and right ear saddle points.

Next, one or more simulations are performed to determine one or more configurations, if any, of the WHUDs 100 that fit the subject's head 302. In particular, one or more three-dimensional models of the WHUD 100 may be applied to one or more models of the subject's head 302 to determine a fit, if any, of the configurations of the WHUD 100 to the subject's head 302. Referring back to FIG. 2, WHUD data 330 stored in the memory 324 may be used to determine a fit of the WHUDs 100, if any, to the subject's head 302. In some implementations, the WHUD data 330 may include information representative of the dimensions of WHUDs 100 or components thereof, which may be used to generate three-dimensional models of the WHUDs 100. For instance, using the WHUD data 330, a first model of a WHUD 100 may be generated using a support structure 110 having a first set of dimensions in combination with an optical splitter 150 having a first set of optical characteristics, and a second model of the WHUD 100 may be generated using a support structure 110 having a second set of dimensions in combination with an optical splitter 150 having a second set of optical characteristics. In some implementations, the WHUD data 330 may include information representative of various three-dimensional models of one or more configurations of the WHUD 100 or components thereof that may be assembled to form a model of the WHUD 100.

The first model and the second model of the WHUD 100 may be applied to the in-plane model of the subject's head 302 to determine whether there is a fit. FIGS. 4A through 4D show representations of a configuration of the WHUD 100 to a model of the subject's head 302. The simulations are performed in a virtual 3D environment in which virtual representations of physical objects in the real-world may be represented. In at least some implementations, two or more virtual representations may be included in the virtual 3D environment to determine relationships between various parts of the virtual representations corresponding to physical objects. For example, in the virtual 3D environment, features of a first virtual representation representative of a first physical object may be positioned adjacent to corresponding features of a second virtual representation representative of a second physical object to determine the fit or compatibility of the first physical object with the second physical object.

Representing virtual representations in the virtual 3D environment may include modelling features of the virtual representations without visual display of the virtual representations via a display.

Figure 4A:
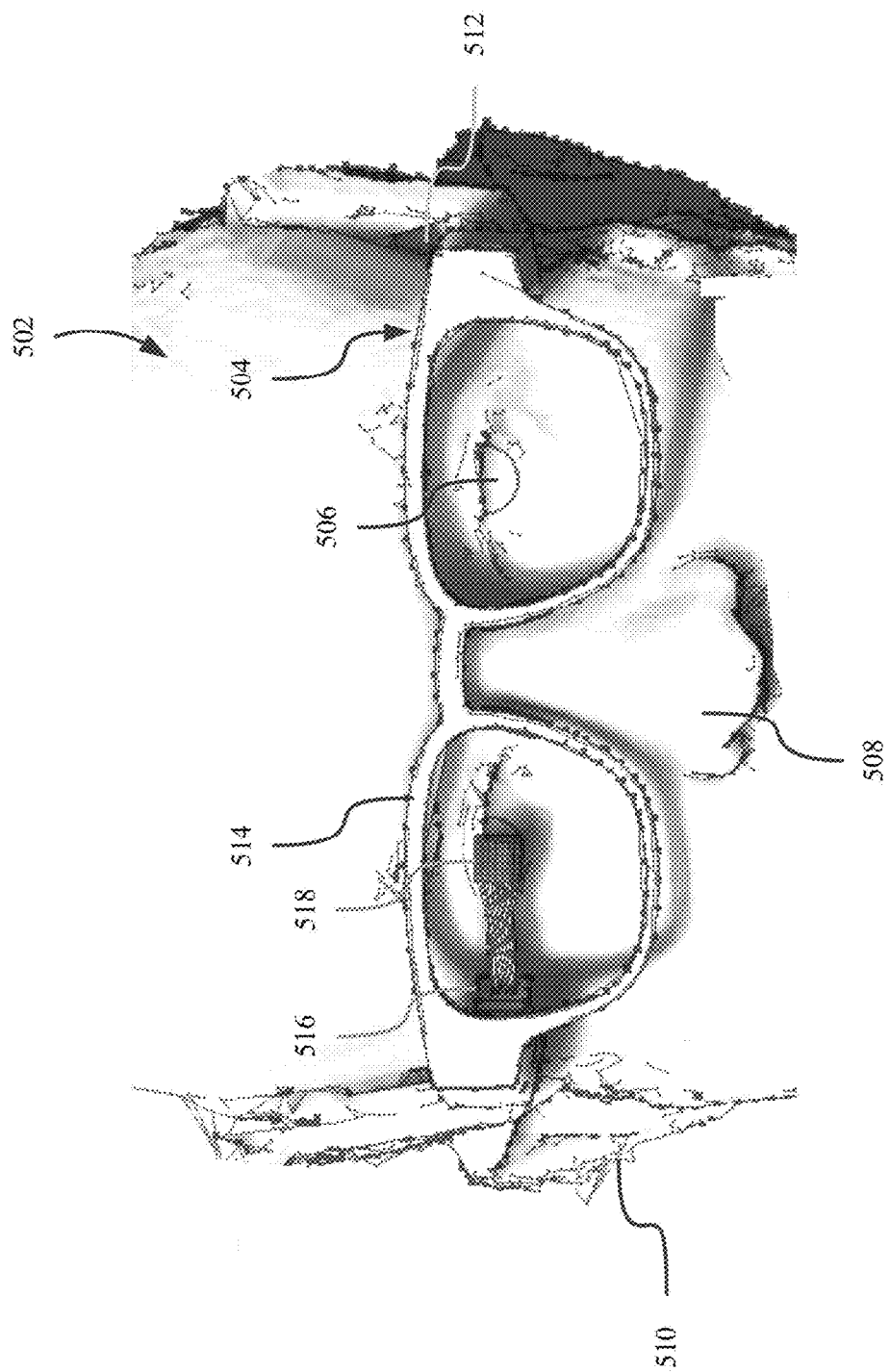
FIG. 4A is a front elevational view that shows a model representative of a wearable heads-up display proximate to a model representative of the head of the subject according to one or more implementations.

Although only an upper portion of the head 302 is depicted in the virtual 3D environment, the model(s) generated may include other portions of the subject's head 302 not depicted. FIG. 4A shows a virtual 3D environment 500 simulating a model 504 of a configuration of the WHUD 100 relative to a model 502 of the subject's head 302. The head model 502 includes representations 506 of the subject's pupils, a representation 508 of the subject's nose, representations 510 of the subject's ears, and representations 512 of the subject's sideburns, as well as the subject's eyelashes. The WHUD model 504 comprises a representation 514 of the support structure 110, and a representation 516 of the optical splitter 150. The pupil representations 506 correspond to an area of the eye including both the iris and the pupil, as the iris may dilate or contract to expand or contract the pupil.

A representation 518 of an optical path of the laser light emitted from the optical splitter 150 and reflected from the holographic combiner 130 is also depicted in FIG. 4A. The optical path representation 518 is generated by tracing the path of laser signals that would be generated by laser light of the WHUD 100. In particular, the system 320 or remote system 328 may determine the path that one or more laser signals would take as a result of being emitted from the optical splitter 150. The determination regarding the path of the one or more laser signals may be based at least in part on the WHUD data 330. For instance, the WHUD data 330 may include information regarding optical characteristics of the SLP 120, the holographic combiner 130, and/or the optical splitter 150. Using the information regarding the optical characteristics, the system 320 or remote system 328 may trace the path of the laser signals emitted from the optical splitter 150 and redirected from the holographic combiner 130. In some implementations, the WHUD data 330 may include predetermined information specifying the path of the laser signals based on the configuration of the WHUD 100 (e.g., size of components, type of components). The representation 518 of the optical path of the laser light may be generated as part of the WHUD model 504, or may be generated or determined as part of a separate process.

Figure 4B:
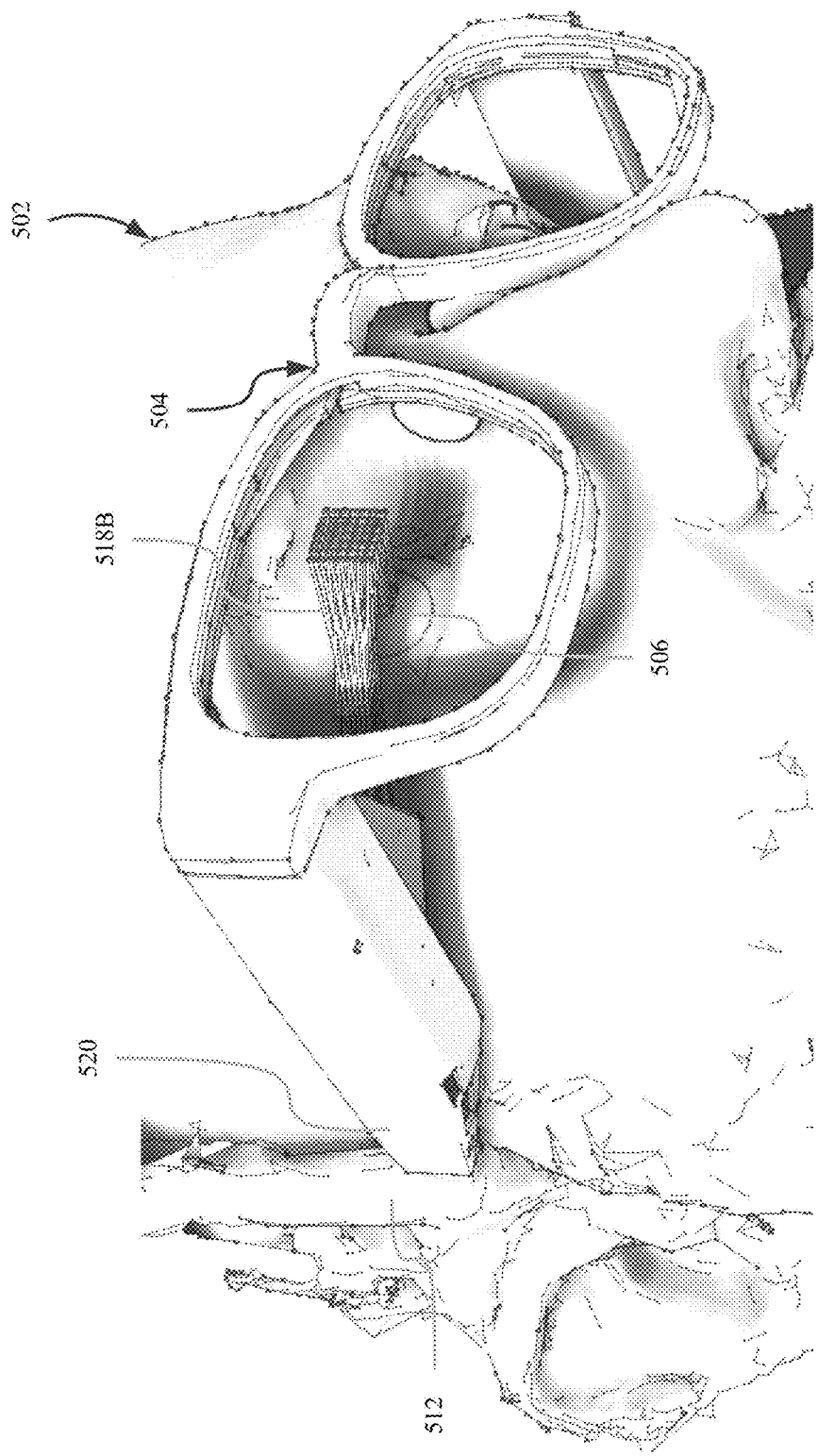
FIG. 4B is an oblique view of the model of FIG. 4A.
Figure 4C:
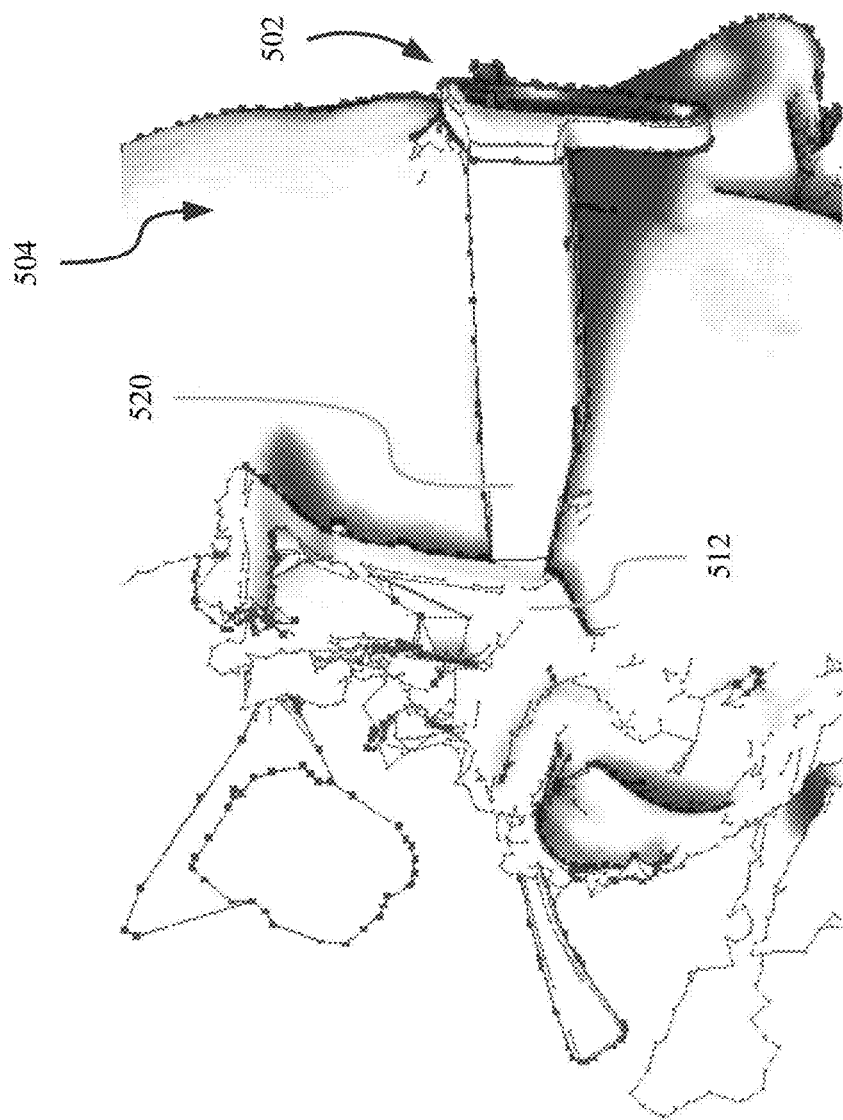
FIG. 4C is a right profile view, that corresponds to a right side of the head of the subject, of the model of FIG. 4A.
Figure 4D:
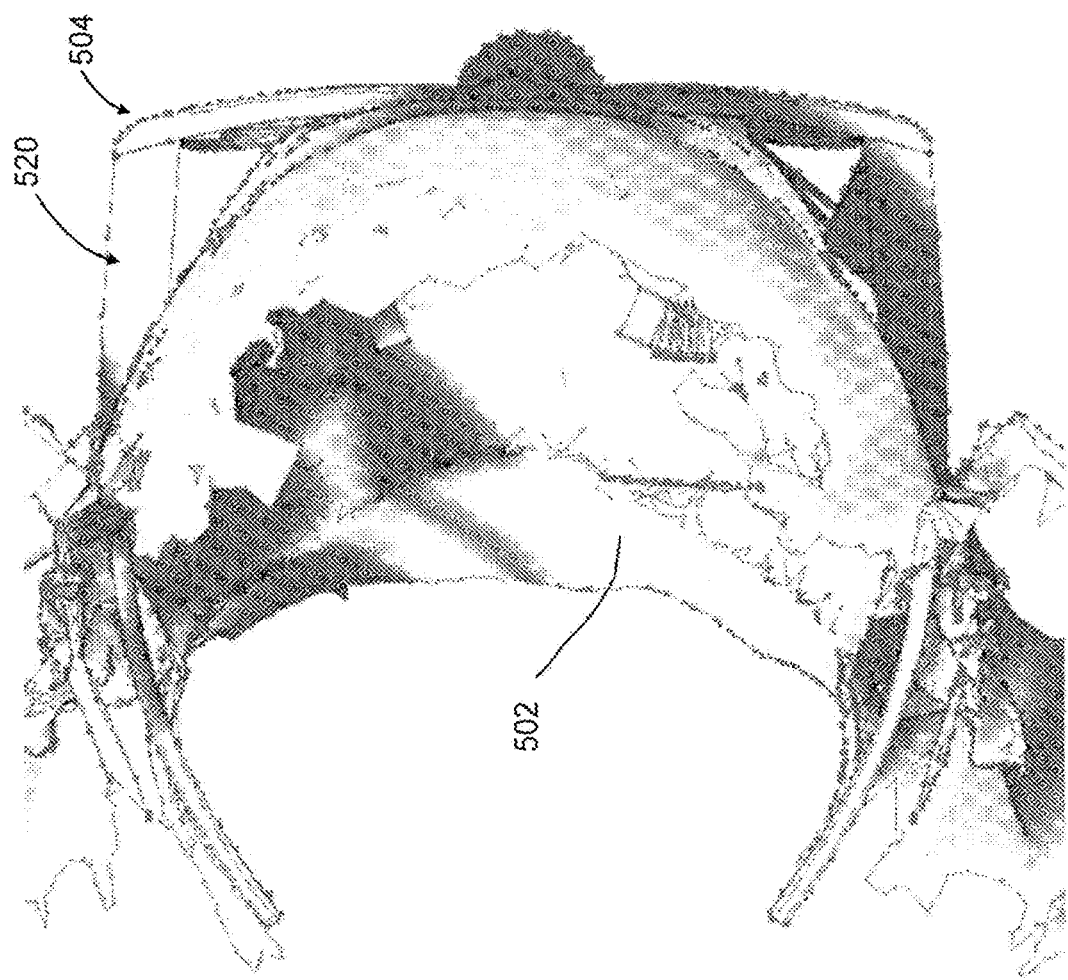
FIG. 4D is a top plane view of the model of FIG. 4A.

FIG. 4B shows another view of the virtual 3D environment 500 simulating the WHUD model 504 relative to the head model 502. In implementations, it can be determined whether the second portion 518B is incident upon the central portion of the pupil representation 506. The view of FIG. 4B includes a representation of a temple arm 520 extending through a sideburn representation 512. FIG. 4C shows another view of the virtual 3D environment 500 simulating the WHUD model 504 relative to the head model 502. In the example depicted, it can be determined that the temple arm 520 representation is extending through the sideburn representation 512 and resting on an ear saddle of the head model 502. FIG. 4D shows another view of the simulation of the WHUD model 504 relative to the head model 502. In the example depicted, it can be determined that the temple arm 520 representation is extending through the sideburn representation 512 and resting on an ear saddle of the head model 502.

Figure 5:
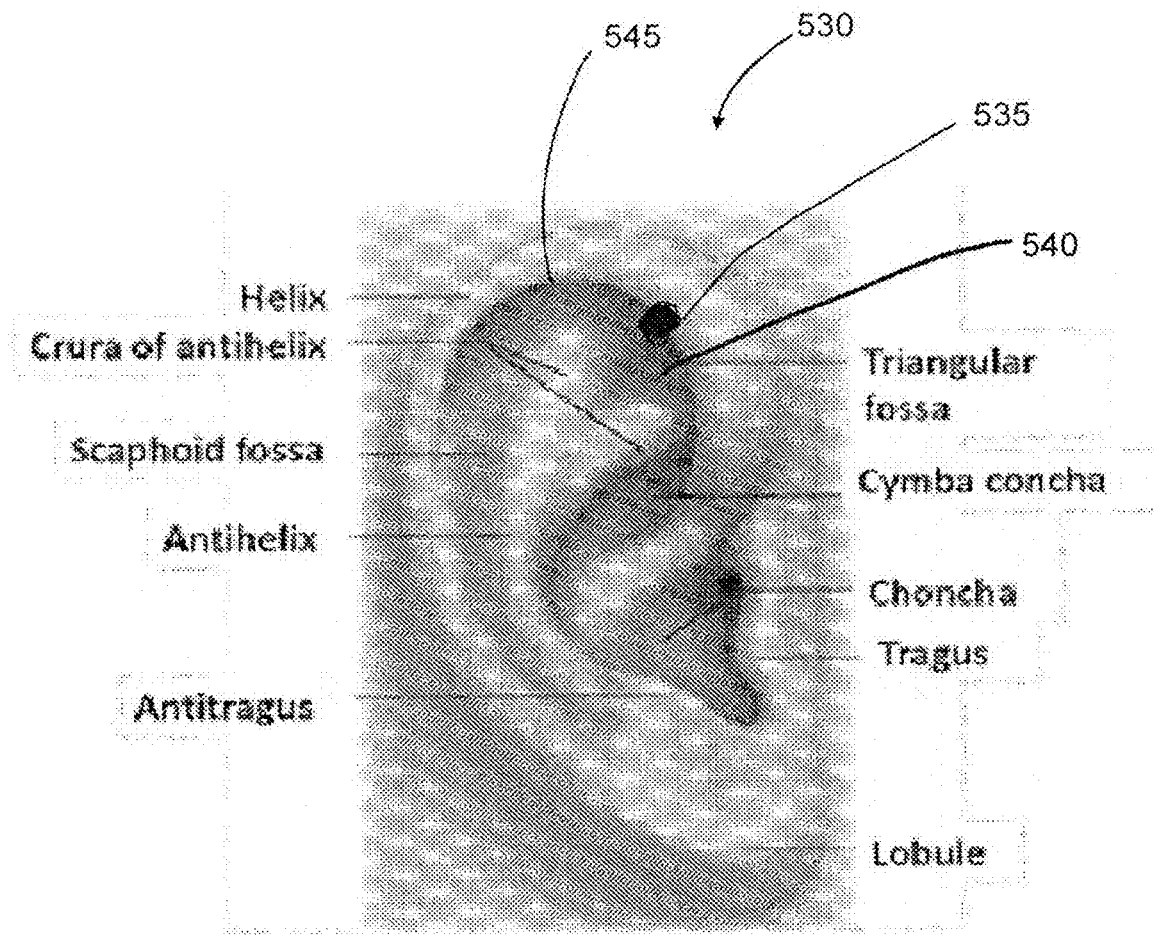
FIG. 5 shows anatomical details of a subject's ear as seen in a profile view.

FIG. 5 shows anatomical details of a subject's ear 530 as seen in a profile view. In implementations, automatic ear saddle detection is used to determine 3D coordinates of the ear saddle point, which is the point where the arm of a wearable apparatus, e.g., glasses or WHUD 100, would rest behind the subject's ear 530. The determined coordinates could also be used as an indication of the subject's head breadth. Through two processes discussed below, i.e., empirical measurements and jig measurements, a point 535 has been determined on the surface of the ear as seen from the profile view which corresponds with a high degree of accuracy to the 3D ear saddle point across a large portion of the population. In other words, the point determined from the 2D profile view is directly in front of the 3D ear saddle point (when viewed in a side image of the ear) across a large portion of the population regardless of ear shape and size. Relative to subject, if a line were to be drawn between the subject's true ear saddle point and the ear saddle point determined from 2D profile view, this line would be parallel to a transverse plane of the body (i.e., the plane which is parallel to the ground). In implementations in which a subject is illuminated primarily by a combination of overhead, frontal, and ambient lighting, the determined 2D ear saddle point 535 is about at the intersection of a shadow within the triangular fossa 540 and the inner boundary of the helix 545.

In embodiments, the determination of the 3D coordinates of the ear saddle point may begin with 2D detection of a point 535 on the ear which corresponds to the ear saddle point. The 2D detected point 535 is in line with the 3D ("true") ear saddle point in a direction substantially orthogonal to the 2D representation of the subject's ear (i.e., in a direction parallel to the transverse plane, which is parallel to the floor). The detection of the 2D ear saddle point 535 can be done empirically through user studies, e.g., by placing WHUD 100 on subjects and determining a point 535 where, in the 2D plane of the representation of the ear, the arm of the WHUD 100 passes through while resting on the subject's ear saddle point. Alternatively, a determination of the point 535 can be done by placing a pair of glasses or a ruler on a subject's ear and seeing where it rests.

In embodiments, a device with known geometry and target markers on it, referred to as an ear saddle jig, may be used in the determination of the 3D coordinates of the ear saddle point. The ear saddle jig may, for example, have a toroidal structure which can sit behind a subject's ears. Once the ear saddle jig is in position, the target markers may be detected, e.g., using computer vision techniques. Because the geometry of the jig relative to the target markers is known, the 3D position of the portion of the toroid seated on the ear saddle point can be determined. The 3D coordinates of the ear saddle point determined in this manner can be projected onto the profile view camera plane which is being used for the 2D detection to determine a corresponding 2D ear saddle point, i.e., a point on the ear which is in line with the ear saddle point.

Using the "ground truth" provided by 3D point measurements, e.g., empirical measurements and ear saddle jig measurements, a data set of 2D ear saddle points 535 can be produced and correlated with profile view camera images. In implementations, this data set may be used to train a model, e.g., a machine learning model, to determine the 2D ear saddle point 535 from profile view camera images, as discussed in further detail below.

Figure 6:
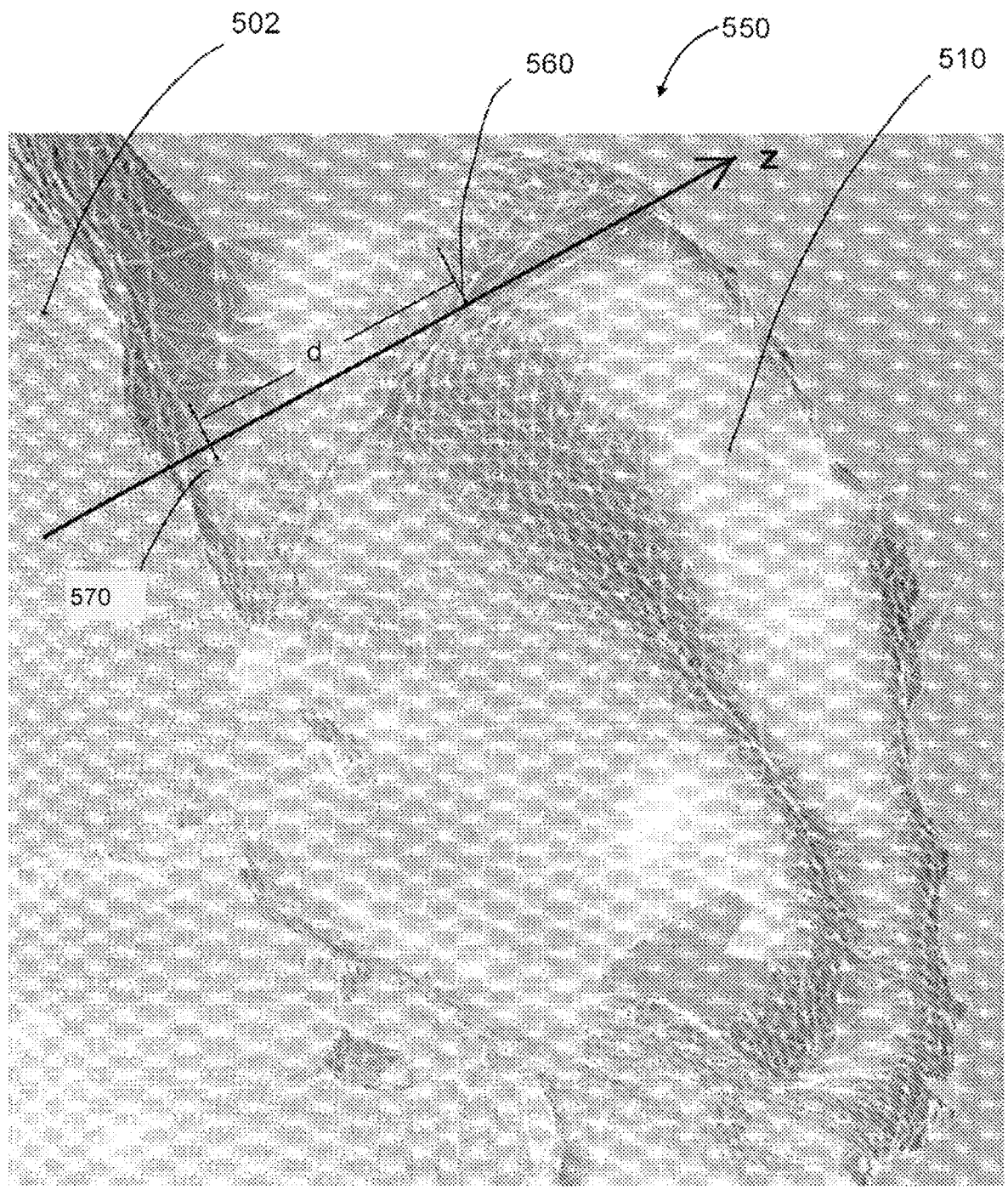
FIG. 6 shows a 3D mesh obtained from a portion of the model of the subject's head, including representations of the subject's ears according to one or more implementations.

FIG. 6 shows a 3D mesh surface 550 obtained from a portion of the model 502 of the subject's head 302, which, as explained above, includes representations 510 of the subject's ears. The determined 2D ear saddle point 535 (e.g., determined from profile view camera images using a model) is projected onto the 3D mesh surface 550. The result may be referred to as the projected 2D ear saddle point 560. Although, it should be noted that once the 2D ear saddle point 535 has been projected onto the 3D mesh surface 550, the resulting projected 2D ear saddle point 560 is a "3D" point, i.e., a point in the three-dimensional coordinate system of the mesh surface 550.

Based on the projected 2D ear saddle point 560, the algorithm determines the depth of the 3D ear saddle point 570, e.g., a point which is on the subject's head 320 near the base of the ear and which may be referred to as a "true 3D ear saddle point" (i.e., the point where the arm of a wearable apparatus, e.g., glasses or WHUD 100, would rest behind the subject's ear). The algorithm searches a region of the 3D mesh surface 550 around the projected 2D ear saddle point 560 (e.g., a region of the mesh surface within a given radius or defined bounding box around the projected 2D ear saddle point) and finds the maximum depth of the mesh 550 within this vicinity. In embodiments, constraints may be applied to the depth search region to improve accuracy. For example, the portion of the search region below the ear saddle point and toward the back of the head may be reduced, so that the depth measurement does not include the deep inner ear canal region (which would result in too deep of a prediction). Minimum and maximum limits may be applied to the depth measurement based on statistics derived from physical measurements of subjects.

The maximum depth of the 3D mesh surface 550 in the designated region corresponds to the maximum distance between the projected 2D ear saddle point 560 and the deepest portion of the mesh surface around the projected 2D ear saddle point 560, measured along a transverse axis. The transverse axis, in implementations, may be referred to as a z-axis and may extend in a direction outward from the subject's head so as to be perpendicular to a plane of the profile view camera images. In the example of FIG. 6, the depth is indicated as the distance, d, between the projected 2D ear saddle point 560 and the true 3D ear saddle point 570 along a transverse axis. In this manner, the true 3D ear saddle point 570 of the subject may be determined with a high degree of accuracy, e.g., to within less than about 1.5 mm. In disclosed embodiments, the 3D coordinates of the projected 2D ear saddle point 560 may be used as a basis for determining the true 3D ear saddle point 570 by modifying (e.g., replacing or adjusting) the depth coordinate of the projected 2D ear saddle point 560 with the depth coordinate of the point at the deepest depth, d, found within the depth search region around the projected 2D ear saddle point 560. In embodiments, the depth coordinate, i.e., the z-axis coordinate, of the projected 2D ear saddle point 560 is replaced with the z-axis coordinate of the maximum depth point found in the search, to produce the true 3D ear saddle point 570.

In implementations, the "projected" 2D ear saddle point can be determined without actually performing a projection orthogonal to the plane of the camera, in which case the point may be referred to as the "outer" 2D ear saddle point. For example, ear saddle point predictions may be performed using 2D detection of a point 535 on the ear which corresponds to the ear saddle point by using two cameras and intersecting the results to obtain a 3D ear saddle point on the surface of the ear. As a further example, a single camera ear saddle point prediction may be performed in conjunction with a model which is trained to estimate the depth (d) of the ear saddle point given the population model and the outer 2D ear saddle point.

It has been found that the position of the projected 2D ear saddle point 560 aligns with a high degree of accuracy to the position of the 3D ear saddle point 570 for a large portion of the population (e.g., a line connecting the projected 2D ear saddle point 560 and the true 3D ear saddle point 570 will be orthogonal to the sagittal plane).

As discussed above, the 2D point 535 on the ear which corresponds to the ear saddle point may be detected from profile view camera imagery. In alternative embodiments, imagery from one or more front cameras with a view of the subject's ears (in conjunction with 3D mesh data) may be used in lieu of profile view camera imagery. In implementations, the detection of the 2D ear saddle point may be aided by object detection algorithms which make use of machine learning methods. To improve the performance of such algorithms, one can collect larger datasets to train the machine learning methods. In implementations, data augmentation techniques may be used to expand a data set and make it more resilient to changes in measurement conditions, such as scale, rotation, and lighting. In embodiments, this may be done using computer vision techniques to rotate the imaged ears, increase and/or decrease their size, blur them, adjust the lighting, etc. In practice, the true ear saddle points may be known through a manual annotation process (or a "ground truth" measurement process, such as measurements done with an ear saddle jig) and, in such a case, the augmentation can be applied to the true ear saddle point such that it can be tracked in the augmented images.

The complexity of the object recognition task means that a model should also have prior knowledge to compensate for insufficient training data. Convolutional neural networks (CNNs) constitute one such class of models. Their capacity can be controlled by varying their depth and breadth, and they also make strong and mostly correct assumptions about the nature of images (e.g., stationarity of statistics and locality of pixel dependencies). A convolutional neural network may include convolution layers, polling layers and "fully connected" layers. To process an image, filters are applied, each of which generates an output referred to as a "feature map" which has a specified depth, k. CNN uses filters to extract features of an image. After using convolution layers to extract the spatial features of an image, the fully connected layers can be applied for the final classification. For each convolution layer, the spatial dimension is reduced while increasing the depth of the feature maps. Such a configuration is referred to as a "convolutional pyramid". Recognizing objects at vastly different scales is a fundamental challenge in object recognition. Feature pyramids built upon image pyramids (i.e., "featurized image pyramids") may form the basis of a solution. Such pyramids are scale-invariant in the sense that an object's scale change is offset by shifting its level in the pyramid. This property enables a model to detect objects across a large range of scales by scanning the model over both positions and pyramid levels. An advantage of featurizing each level of an image pyramid is that it produces a multi-scale feature representation in which all levels are semantically strong, including the high-resolution levels.

In implementations, an object recognition model may be used to pick out the bounds of the ear 530 within the profile view of the image (e.g., profile view camera imagery). For example, the "RetinaNet" architecture may be used (see, Tsung-Yi Lin et al., "Focal Loss for Dense Object Detection," Facebook AI Research, arXiv:1708. 02002v2). RetinaNet is described as a single, unified network composed of a backbone network and two task-specific subnetworks. The backbone is a convolutional network responsible for computing a convolutional feature map over an entire input image. The first subnet performs convolutional object classification on the backbone's output, and the second subnet performs convolutional bounding box regression. The model may use a feature pyramid network (FPN) as the backbone network. FPN augments a standard convolutional network with a top-down pathway and lateral connections so the network efficiently constructs a rich, multi-scale feature "pyramid" from a single resolution input image. Each level of the pyramid can be used for detecting objects at a different scale.

In embodiments, the method may take a single-scale image of an arbitrary size as input, and output proportionally-sized feature maps at multiple levels, in a fully convolutional fashion. Such a process is independent of the backbone convolutional architectures (see, A. Krizhevsky, I. Sutskever, and G. Hinton, "ImageNet classification with deep convolutional neural networks," Neural Information Processing Systems, 2012). The construction of a pyramid may involve a bottom-up pathway, a top-down pathway, and lateral connections. The bottom-up pathway is the feedforward computation of the backbone (e.g., ResNet), which computes a feature hierarchy consisting of feature maps at several scales, e.g., with a scaling step of two. In implementations, there may be many layers producing output maps of the same size and such layers may be deemed to be in the same network stage. For the feature pyramid, one pyramid level may be defined for each stage. The output of the last layer of each stage may be chosen as the reference set of feature maps, which may be enriched to create a pyramid. This is advantageous because the deepest layer of each stage would normally have the strongest features.

In embodiments, a RetinaNet model architecture may be used. For example, the architecture may provide a one-stage detector which uses a feature pyramid network based on a ResNet backbone to generate a multi-scale convolution feature pyramid. To this backbone, two subnetworks are attached, one which classifies the anchor boxes and one which does regression of the anchor boxes.

A second model may be provided which uses scanning windows to produce a heat map (i.e., probability map) of the ear, with higher weights on sections which are more likely to be the ear saddle point of interest (W. Fuhl, T. Santini, G. Kasneci, and E. Kasneci, "Pupilnet: Convolutional neural networks for robust pupil detection," arXiv: 1601.04902, 2016). In implementations, a region of interest (ROI) image (e.g., a region about 400 by 700 pixels in size) may be down-sampled, e.g., by a factor of six. Then, windows may be created of size, e.g., 31 by 31 pixels centered around each point in the down-sampled image, with the center point being classified as being the ear saddle point. The second model may have, e.g., three convolution layers of 3×3 filter size, followed by two fully-connected layers. The output of second model is a probability that the input box is centered around the true ear saddle point. Post-processing may be performed on this output to pick out the most probable ear saddle point, as well as a confidence value in this point being accurate. As discussed in further detail below, the confidence value may be used to determine whether to proceed with the automatic prediction or to resort to the use of an ear saddle jig. In implementations, a confidence of greater than about 0.5 is sufficient for a given tolerance to error. It has been found that over 90% of the population can be automatically predicted using this method.

Figure 7:
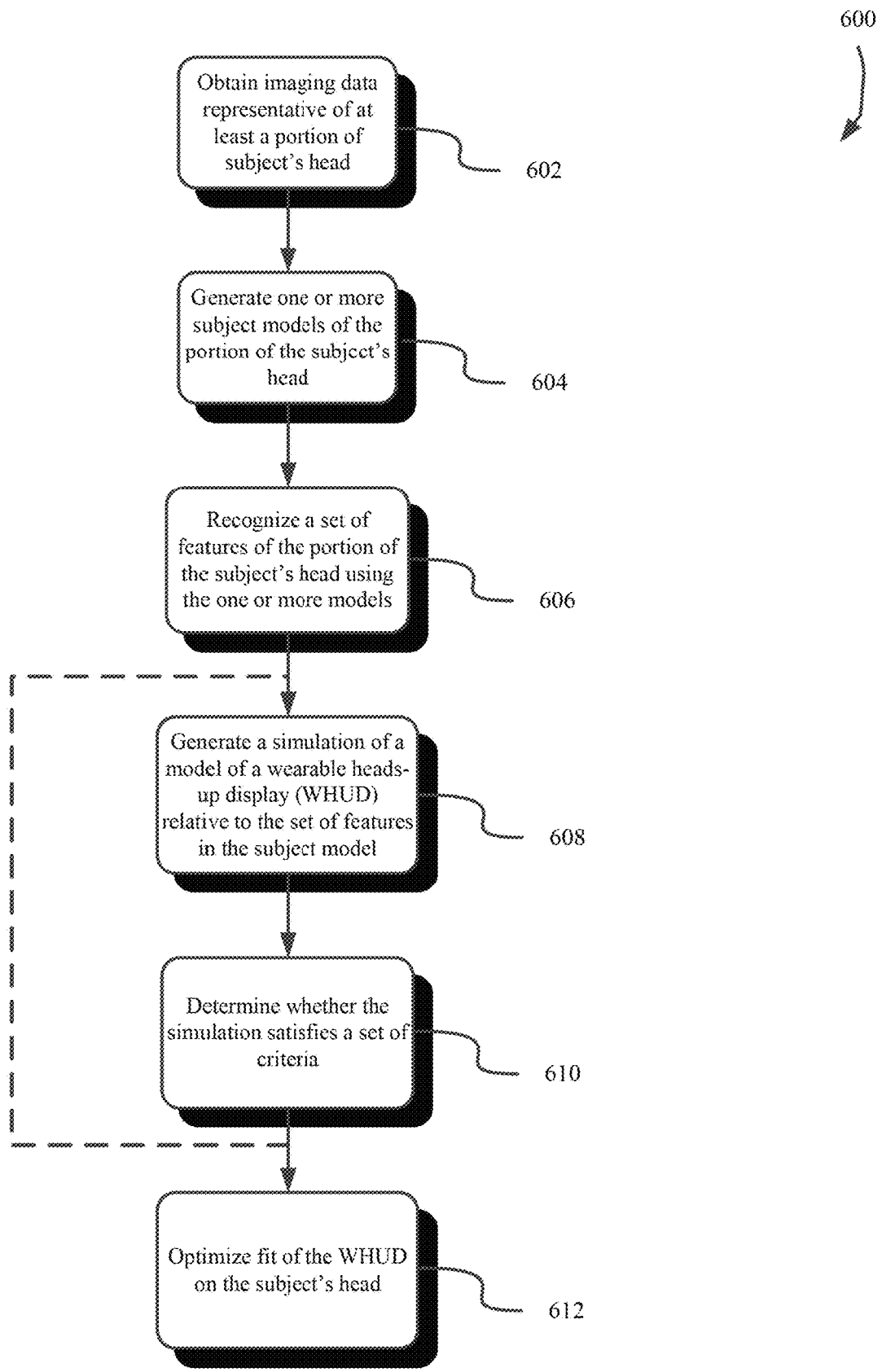
FIG. 7 is a flow diagram illustrating a computer-implemented algorithm or method for determining a fit of a wearable heads-up display to the subject's head according to one or more implementations.

FIG. 7 shows a computer-implemented method 600 for automatically determining a fit of the WHUD 100 to the subject's head 302 according to one or more implementations. The method 600 may be performed by one or more appropriate processor-based systems described herein, such as the system 320, and may involve one or more remotely located processor-based systems, such as the remote system 328. The method 600 includes obtaining 602 imaging data 318 representative of at least a portion of the subject's head 302. For instance, obtaining 602 imaging data 318 may include providing instructions to the subject guiding the subject to allow the plurality of cameras 306 to capture sets of images of portions of the subject's head 302. The cameras 306 may be arranged on left and right sides of the subject to capture imaging data 318 obtained may include data representative of eyes and ears of the subject. In some implementations, one or more cameras may be positioned in front of the subject within the subject's field of view. The imaging data 318 may be captured in accordance with the method 700 described below.

Next, at 604, the system 320 may generate, or otherwise cause to be generated, one or more subject models of at least a portion of the subject's head 302 according to one or more implementations. The one or more subject models are generated using the imaging data 318 obtained in 602 and described elsewhere herein. In some implementations, the system 320 may generate 604 the one or more subject models using the imaging data 318. In some implementations, the one or more subject models may be generated by the remote system 328 using imaging data 318 provided by the system 320. For example, the system 320 may send the imaging data 318 to the remote system 328, which uses the imaging data 318 to generate the one or more subject models and provides or otherwise makes available the one or more subject models to the system 320. Generating 604 one or more subject models 502 of the subject's head 302 is described in greater detail, for example, with reference to FIG. 2.

In connection with generating 604 the one or more subject models 502, a plurality of images (or portions thereof) of the imaging data 318 may be combined to generate the one or more subject models 502. For instance, a first image from a first camera of the cameras 306 in a first position may be combined with one or more other images from other cameras of the cameras 306 (and/or with one or more other images from the same first camera in one or more different positions if the first camera is movable/displaceable) to generate a three-dimensional model of at least a portion of the subject's head 302. The subject models 502 generated may include information representative of peripheral surfaces and features of the head 302, including skin, eyes, ears, eyelashes, and hair.

The method 600 includes recognizing 606 a set of features in at least one subject model of the one or more subject models 502 generated in 602 (which may, in some implementations, include recognizing such feature(s) in at least one two-dimensional image from which the model was compiled and locating such feature in the model). The set of features recognized 606 include pupil centers of representations of both the left eye and the right eye of at least one of the subject models 502. In some implementations, the set of features recognized 606 include recognizing at least a portion of the sideburn representations 512 in the at least one subject model 502. Recognizing 606 the set of features may include recognizing, in a plurality of the subject models 502, regions corresponding to the representations of the eyelashes.

Next, the method 600 includes positioning, in a virtual environment, a the WHUD model 504 and at least one of the subject models 502 relative to each other using the set of features recognized. Positioning 608 may be performed by an appropriate processor-based system, such as the system 320, and may be remotely performed by the remote system 328 in some implementations. The virtual environment is a three-dimensional computational environment of the system 320 (or remote system 328 when applicable) in which the WHUD model 504 and one or more subject models 502 can be implemented. In the virtual environment, respective models can be moved, rotated, and oriented to position parts of the models, including the representations 518 of the optical path, relative to each other to determine whether a configuration of a WHUD 100 corresponding to the WHUD model 504 would constitute a fit for the subject's head 302. Positioning may include moving one or both models in the three-dimensional virtual environment (i.e., moving model in an X-direction, a Y-direction, and/or a Z-direction) and/or rotating one or both models in the three-dimensional virtual environment (i.e., rotating model about an X-axis, a Y-axis, and/or a Z-axis).

Positioning 608 the WHUD model 504 may include obtaining WHUD data 330 regarding one or more WHUD configurations from the memory 324. The WHUD data 330 regarding the one or more WHUD configurations may be used to generate one or more corresponding WHUD models 504 that are representative of actual configurations of the WHUD 100 available to consumers. As described with respect to FIGS. 4A through 4D, the WHUD models 504 are sized and shaped to correspond to the size and shape of actual configurations of the WHUD 100, and include optical path representations 518 corresponding to the configuration of the optical equipment (e.g., optical splitter 150, SLP 120, holographic combiner 130) of the configuration of the actual WHUD 100. In some implementations, data corresponding to the WHUD models 504 may be stored in the memory 324 such that it is not necessary to generate the WHUD models 504 for every simulation.

Figure 9:
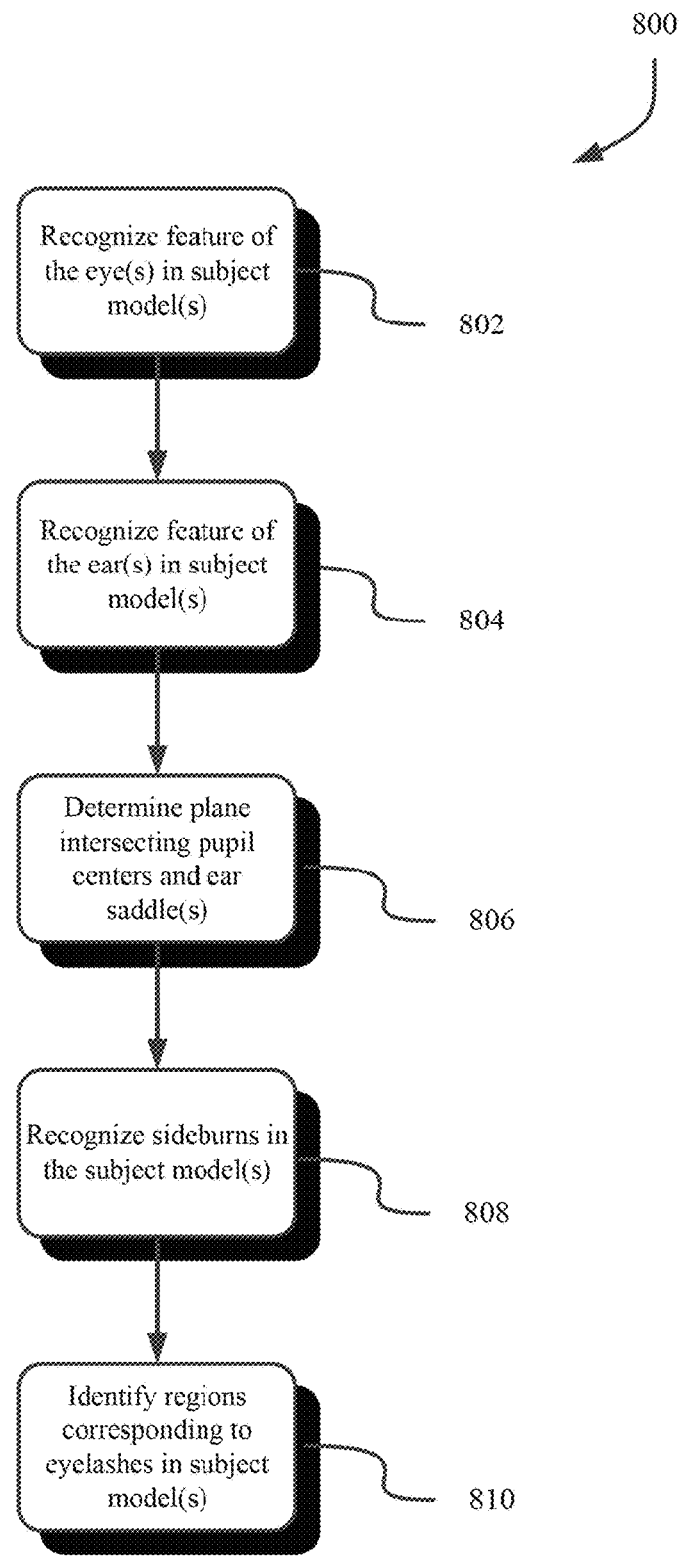
FIG. 9 is a flow diagram illustrating a computer-implemented algorithm or method for recognizing a set of features in one or more subject models according to one or more implementations.

Positioning 608 the models relative to each other comprises generating, in a virtual 3D environment of the system 320 or the remote system 328, the WHUD model 504 and the subject model 502 in the virtual environment and positioning one or both of the models using the set of features recognized. The subject model 502 The WHUD model 504 is positioned in the virtual 3D environment with temple arm 520 representations between the head representation and corresponding left and right ear representations 510 with the eyeglass lenses of the WHUD model 504 positioned in front of corresponding left and right eye representations of the subject model 502. Information regarding the glasses plane determined for the subject model 502, as described herein with respect to FIG. 9, is obtained and used to determine a fit, if any, of the WHUD model 504 to the subject model 502. For example, the glasses plane intersecting at least one pupil center and the ear saddles is superimposed on the subject model 502. Alternatively, the glasses plane intersecting both pupil centers and at least one ear saddle may be used. The simulation includes updating the position and/or orientation of at least one of the WHUD model 504 and the subject model 502 to align features of the WHUD model 504 with the corresponding recognized features of the subject model 502. In particular, the system 320 (or remote system 328) attempts to align the center of the second portion 518B of the optical path representation 518 with a pupil center of the corresponding the pupil representation 506 and attempts to align temple support portions of the temple arm 520 representations with corresponding ear saddles of the ear representations 510.

The method 600 proceeds to determining 610, based on positioning 608 one or both models, whether the WHUD model 504 satisfies one or more of a set of criteria for evaluating a fit of the WHUD 100 to the subject's head 302. The set of criteria is information, stored in memory, specifying conditions between features of the WHUD model 504 and the subject model 504 determinative of a fit of a corresponding configuration of the WHUD 100 to the subject's head 302. To determine whether the one or more criteria are satisfied, the system 320 (or remote system 328 when appropriate) may position and rotate the WHUD model 504 into proximity with corresponding portions of the subject model 502.

One criterion specifies a proximity of the temple arm 520 representation of the WHUD model 504 with the ear representation 510 of the subject model 502. In particular, the first criterion may specify that a temple support portion (i.e., corresponding to the temple support portion 112) of the temple arm 520 representation is in contact with an ear saddle of the ear representation 510. Another criterion of the set of criteria may relate to a location of a pupil centers of a pupil representation 506 relative to the second portion 518B of the optical path representation 518.

As a result of the simulation satisfying one or more of the set of criteria, the system 320 may determine that a configuration of the WHUD 100 corresponding to the WHUD model 504 represents a fit for the subject's head 302. In some implementations, a determination that the configuration of the WHUD 100 represents a fit is based on satisfaction of two or more of the set of criteria. In some implementations, a determination that the configuration of the WHUD 100 represents a fit is based on satisfaction of all of the set of criteria.

The method 600 may be an iterative process in which various operations are repeated. For instance, after determining 610 whether the simulation satisfies the set of criteria, the method 600 may include a determination of whether there are additional WHUD models 504 corresponding to additional configurations of the WHUD 100 that have not yet been simulated in connection with the subject model 502. If so, the method 600 may return to generate 608 a simulation of another configuration of the WHUD 100. For instance, the system 320 may obtain, from the memory 324, WHUD data 330 for a different configuration of the WHUD 100 that has not yet been simulated. Then, the method 600 may proceed again to determine 610 whether the simulation satisfies one or more of the set of criteria. The system 320 may track which configurations of the WHUD 100 represent a fit for the subject. Each configuration of the WHUD 100 includes at least one component that is different than another configuration. For instance, one configuration may include a different front frame of the support structure 110 (i.e., the portion housing the eyeglass lenses 140) than another configuration. One configuration may include different temple arms 110 than another configuration such that the temple support portions 112 are in a different location relative the other configuration. One configuration may include different optical equipment (e.g., optical splitter 150, holographic combiner 130) than another configuration such that optical characteristics (e.g., optical path of light emitted) of one configuration are different than the other. As a result, the method 600 can be implemented to determine which, if any, configurations of the WHUD 100 will be an appropriate fit for the subject without evaluating the fit of every WHUD 100 configuration to the subject's head 302 in the real world. Moreover, due to the optical characteristics of the optical components of the WHUD 100, it may be difficult for the subject to realize that a WHUD 100 configuration may not constitute a good fit.

The method 600 may further include, for one or more WHUD 100 configurations determined as constituting a fit for the subject's head 302, optimizing 612 the fit of the WHUD 100 on the subject's head 302. Some configurations of the WHUD 100 may have features that can be modified to adjust the fit of the WHUD 100 to the subject's head 302. Some modifications may improve the comfort of the WHUD 100 for the subject. For instance, some temple support portions 112 of the support structure 110 may include adjustable wire cores that can be reshaped to optimize the comfort of the WHUD 100 for the subject. This may help to distribute weight of the WHUD 100 onto the subject's ears and away from the subject's nose. As another example, the bridge 114 or nose pads 116 thereof may be modified to optimize comfort of the WHUD 100.

The subject may be presented with one or more simulations of WHUD models 504 on the subject model 502 simulating respective configurations of WHUD 100 determined as constituting a fit for the subject. The subject may select one or more WHUD models to try on.

Figure 8:
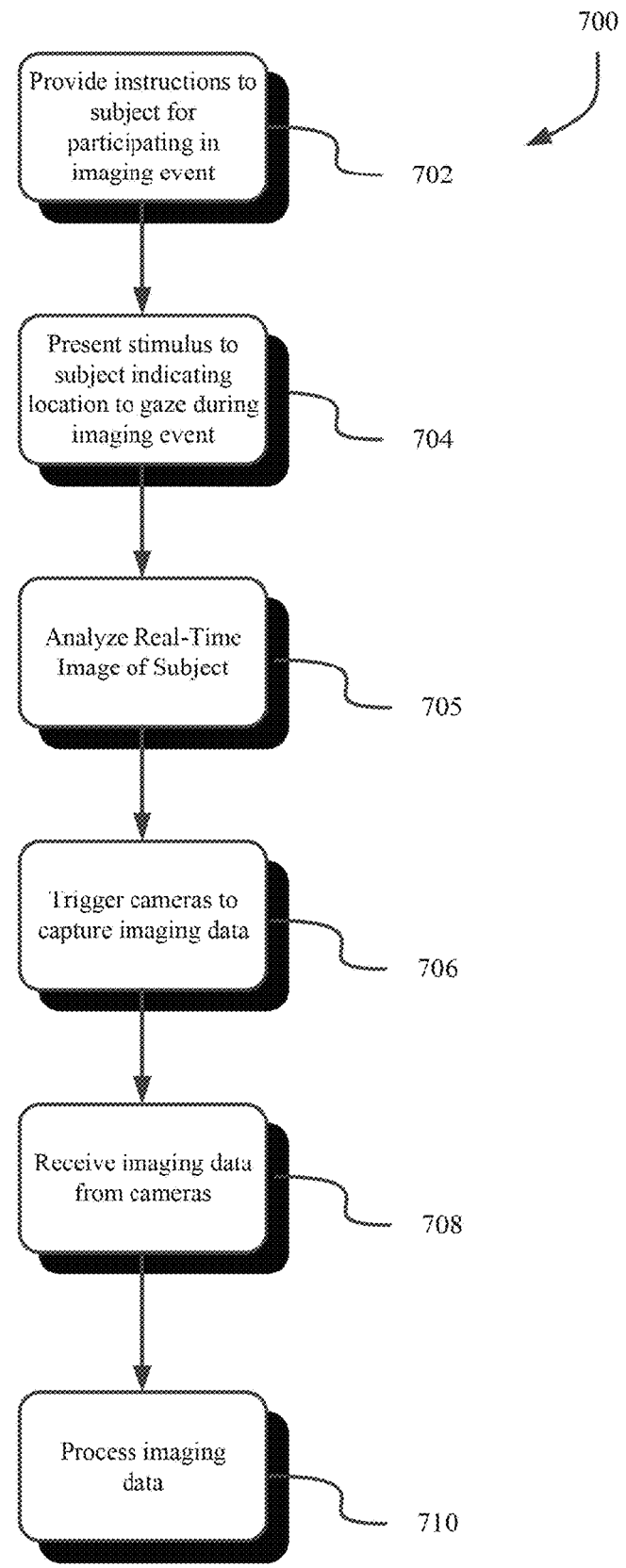
FIG. 8 is a flow diagram illustrating a computer-implemented algorithm or method for obtaining imaging data representative of a subject's head according to one or more implementations.

FIG. 8 shows a method 700 for obtaining the imaging data 318 representative of the subject's head 302 according to one or more implementations. The method 700 may be performed by one or more appropriate processor-based systems described herein, such as the system 320. The method 700 may be initiated by an authorized entity, such as an employee, tasked with operating the system 320 to determine a fit of the WHUD 100 to the subject's head 302. The method 700 may be initiated in response to the authorized entity interacting with the system 320 in a predetermined manner, such as by interacting with an input device of the system 320 to cause the one or more processors 302 to execute at least a subset of the set of instructions 306 causing the system 320 to perform the method 600 described above. The method 700 may be performed by a front portion of the system 320. For instance, one or more processor-based devices may obtain the imaging data according to the method 700, and may then provide the imaging data 318 to a back portion of the system 320 for processing. In some implementations, the front portion of the system 320 may send, over the network 326, the imaging data 318 obtained to the remote system 328 for processing along with a request to generate the one or more subject models 502.

The method 700 includes providing 702 instructions to the subject for participating in an imaging event. The imaging event corresponds to capturing, by at least a subset of the plurality of cameras 306, of a plurality of images at the same time, each image captured from a different viewpoint of the subject. In at least some implementations, the instructions are provided visually on the display 316 by rendered image(s) demonstrating an alignment of the subject's head 302 relative to the overlay 408. In some implementations, the instructions may include text and/or audio instructing the subject regarding how to position their head 302 for the imaging event. During the instructions, the image 406 of the subject's head 302 may be continuously or repeatedly displayed to the subject on the display 316 to provide feedback enabling the capture of appropriate imaging data 318.

The system 320 may then present 704, or otherwise cause to be presented, stimulus to the subject indicating a location to gaze during the imaging event. Presenting 704 the stimulus may include causing a particular indicator 402 to illuminate or causing an indication of a particular location to gaze on the display 316. The stimulus presented to the subject is dependent upon the imaging event about to occur. For instance, the system 320 may cause illumination of the indicator 402A in connection with an imaging event for capturing a set of imaging data wherein the subject's gaze is directed to a particular point above the display 316. In some instances, where the subject is to gaze straight ahead, no stimulus may be provided to the subject; instead, the instructions 410 may instruct the subject to look straight ahead. In connection with presenting 704 the stimulus, the system 320 may cause an audio signal, such as a countdown or a ticking, indicating that an imaging event is about to commence.

The system 320 may then cause 706 at least a subset of the cameras 306 to capture imaging data. For instance, the system 320 may send one or more control signals to at least a subset of the cameras 306 controlling the subset to capture imaging data 318. In some implementations, control signals may be sent to camera subsystems 314 which may cause one or more cameras 306 of the subsystem 314 to capture imaging data 318. As a result of execution of the imaging event, the cameras 306 (or subset thereof) or camera subsystems 314 may then send the captured imaging data 318, which is received 708 by the subsystem 320. The imaging data 318 received may be a set of imaging data 318 to receive during the method of determining 600 a fit of the WHUD 100 to a subject's head 302. There may be a plurality of sets of imaging data 318 received, each corresponding to the subject having a different gaze position of their eyes. The method 700 may further include processing 710 the imaging data 318 received, which may include associating, in the memory 324, the imaging data 318 with an identifier of the subject, time and date information indicating the time and date at which the imaging data 318 was obtained, and information identifying a gaze position that the subject should have during obtaining the imaging data 318.

In some implementations, the method 700 may include analyzing a real-time image of the subject. One of the first set of cameras 308 may obtain a real-time image 406 of the subject's face, as shown in FIG. 3. The real-time image 406 may be analyzed to determine whether the position and orientation of the real-time image 406 satisfies a set of criteria for capturing the imaging data 318. In particular, the set of criteria for capturing the imaging data 318 includes a first criterion indicating alignment of the ear saddles of the image 406 with the first portions 412 of the overlay 408 and a second criterion indicating that the pupils of the image 406 are within the second portions 416 of the overlay 408. As a result of the real-time image 406 satisfying the specified criteria, the system 320 cause 706 the cameras 306 to capture the imaging data 318. In some implementations, however, causing 706 the cameras 306 to capture the imaging data 318 may be performed in response to receiving a manual user input to capture imaging data 318—for instance, by receiving a signal indicating that a particular user interface button has been selected. Alternatively, causing 706 the cameras 306 to capture the imaging data 318 may be performed automatically using a pupil tracking/pupil stability subsystem to determine when the user has switched their gaze to the next point.

FIG. 9 shows a method 800 for recognizing a set of features in the one or more subject models 502 according to one or more implementations described herein. The method 800 may be performed in connection with or as part of recognizing 606 the set of features in the method 600. The method 800 may include recognizing 802 features of the eyes in at least one of the one or more subject models 502. In particular, the system 320 may recognize, in at least the in-plane model, a pupil center in the pupil representations 506 respectively of the left eye and the right eye of the subject model 502. Recognizing the pupil centers may include determining and recording, in the memory 324, coordinates of at least the in-plane model corresponding to the pupil center of the left eye and coordinates of at least the in-plane model corresponding to the pupil center of the right eye.

The method 800 also includes recognizing 804 features of one or both ears in at least one of the subject models 502. More particularly, the system 320 may recognize, in at least the in-plane model, an ear saddle of one or both of the ear representations 510. Recognizing the ear saddles may involve identifying regions in at least the in-plane model between an ear and the side of the head that would support the support structure 110 of the WHUD 100 (e.g., the temple portions of the support structure 110 of the WHUD). The system 320 may use the location of the first portions 412 relative to features in the imaging data 318 captured to recognize the ear saddles. The set of instructions 306 may include executable instructions encoding algorithms for recognizing the ear saddles and the pupil centers. In some implementations, it may be sufficient to recognize 606 three features: the pupil center of the left eye, the pupil center of the right eye, and one of the ear saddles.

Next, the method 800 includes determining 806 a plane intersecting the pupil centers and at least one of the ear saddles recognized in 802 and 804. The plane defining intersection of the pupil centers and the at least one ear saddle is also referred to herein as the glasses plane. Using the recognized features of the ear saddles and the pupil centers, the system 320 determines the glasses plane intersecting with the pupil centers and at least one of the ear saddles. As one example, determining the glasses plane may include identifying, by the system 320, an axis extending between the pupil centers. Then, the system 320 may determine the glasses plane having an angle relative to the axis of the pupil centers intersecting with one or both of the ear saddles. This is, however, a non-limiting example illustrating how the intersecting plane may be determined; other processes and operations of determining the intersecting plane are considered as being within the scope of the present disclosure.

Figure 10:
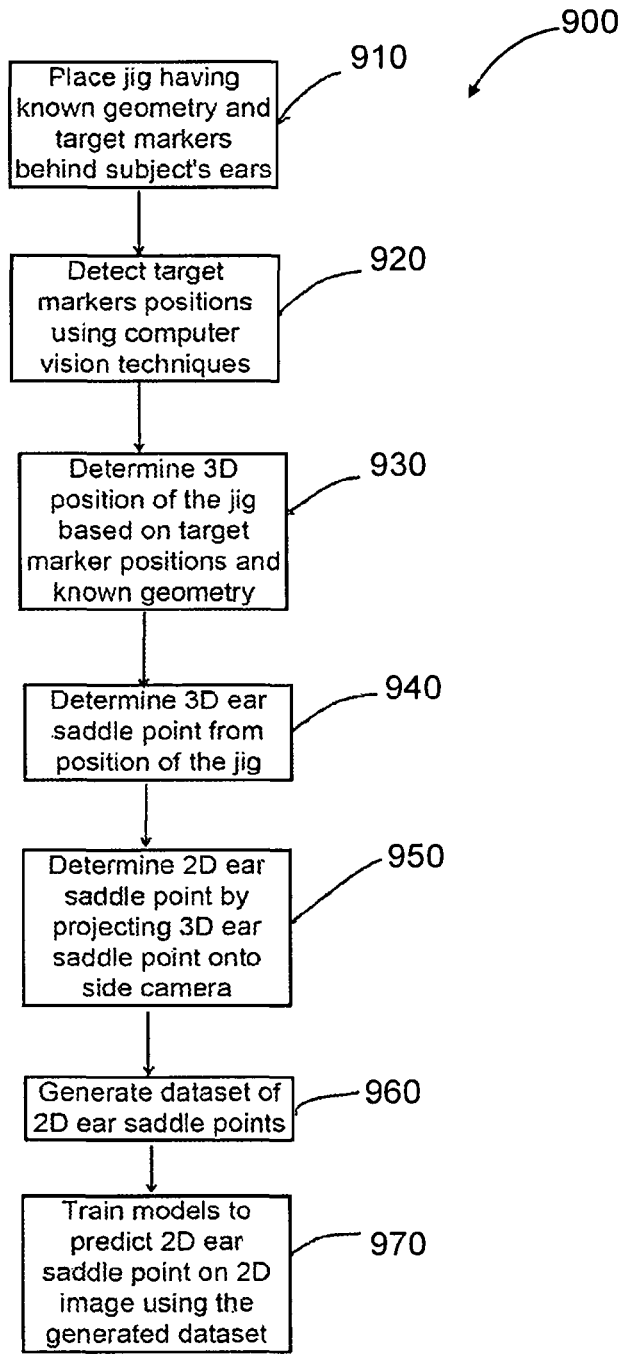
FIG. 10 is a diagram of a method to generate a data set of 2D ear saddle points to train models described herein to allow the models to determine 3D coordinates of a subject's ear saddle point according to one or more implementations.

FIG. 10 shows a method 900 to generate a data set of 2D ear saddle points to train models described herein to allow the models to determine 3D coordinates of a subject's ear saddle point, which is the point where an arm of a wearable apparatus would rest behind the subject's ear. The method 900 may be performed in connection with or as part of recognizing features of the ears in subject models, such as, for example, in method 800 (see, e.g., 804). The method 900 may include placing a jig having known geometry and target markers behind a subject's ears 910 and detecting target markers positions using computer vision techniques 920. The detected target marker positions may be extrapolated, using the known geometry of the jig (e.g., knowing the shape of the jig and the relative positions of the target markers on an outer surface of the jig), to determine the position of the jig in a 3D coordinate space 930. The jig geometry includes information which can be used to determine the positions on the surface of the jig which are in contact with the subject's ear saddle point(s). This information allows for determining the 3D ear saddle point locations (i.e., the ear saddle point locations in a given 3D coordinate space) based on the determined position of the jig 940.

In implementations, the system seeks to determine the 3D ear saddle point locations for a subject without using a jig. To this end, one or more models are trained to determine the 3D ear saddle point locations for a subject based on 2D ear saddle points detected in 2D images of the subject's ears. Therefore, the method 900 may include determining 2D ear saddle point locations by projecting the determined 3D ear saddle point locations (e.g., the 3D ear saddle point locations determined in 940) onto a 2D coordinate system corresponding to a profile camera view of the subject 950. The method 900 may be repeated for multiple subjects to generate a dataset of 2D ear saddle point locations 960. The generated dataset of 2D ear saddle point locations is used to train one or more models 970. The models are used to determine 3D coordinates of a subject's ear saddle point based on 2D ear saddle point locations obtained from profile camera images, as discussed in further detail below.

Figure 11:
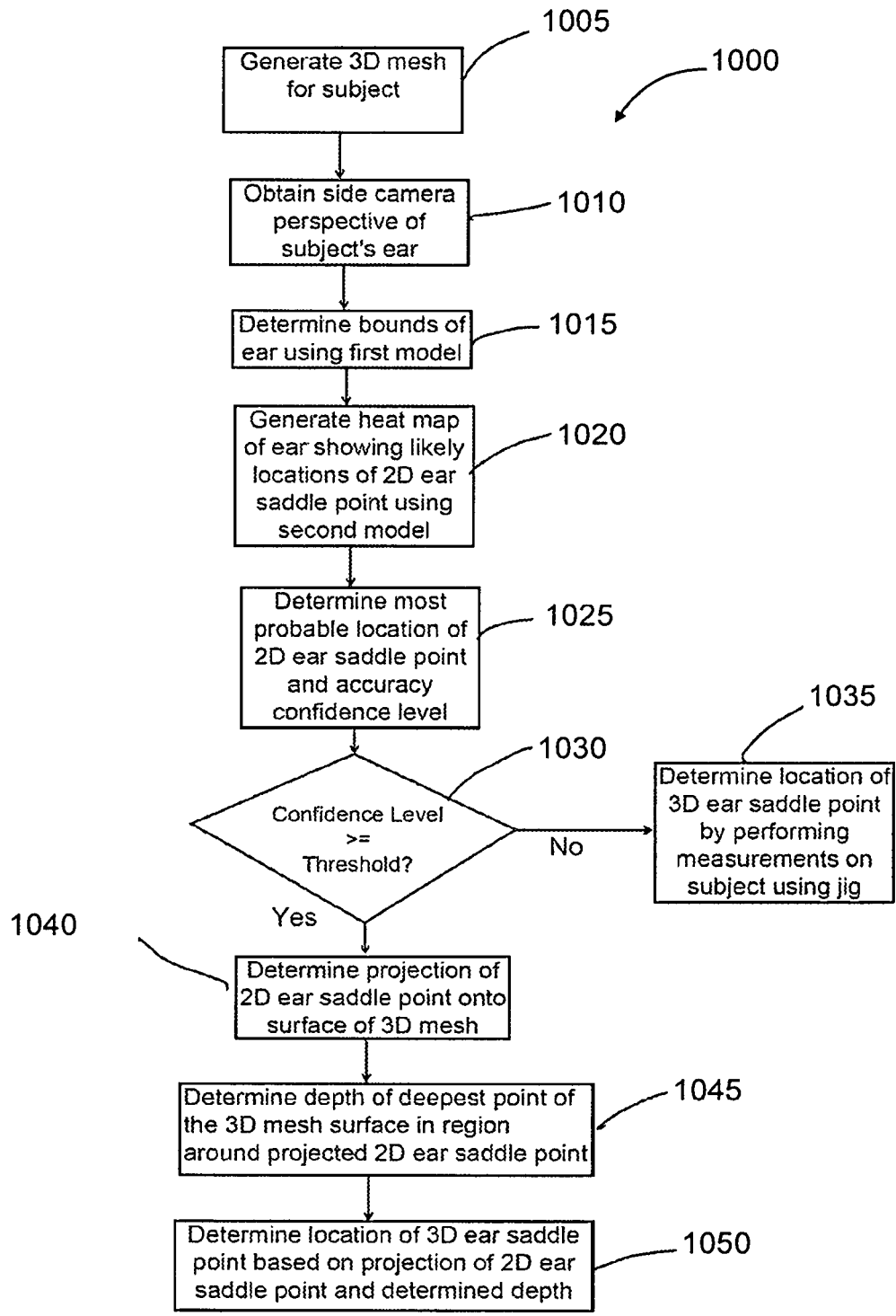
FIG. 11 is a diagram of a method using one or more models to determine 3D ear saddle point locations from profile view images of a subject's ears according to one or more implementations.

FIG. 11 shows a method 1000 using one or more models to determine 3D ear saddle point locations from profile camera perspective images of a subject's ear or ears (in implementations, one or more images are used for one or more ears of the subject). The method 1000 may include generating a 3D mesh surface representing at least a pertinent portion of the subject's head 1005, e.g., from imagery generated by one or more cameras, or other types of imaging equipment. Profile camera perspective images of the subject's ears are obtained 1010, e.g., from imagery used in the generation of the 3D mesh or from imagery taken independently of the 3D mesh generation. In implementations, a trained model, of one or more trained models, may be used to determine bounds of an ear, or a region of interest (ROI) of an ear, of the subject from profile camera perspective images 1015. A second model (if more than one model is used) is used to generate a heat map of the subject's ear 1020, based at least in part on the boundary of the ear determined by the first model, indicating confidence levels of likely locations of 2D ear saddle points. The method 1000 may include determining the most probable location of 2D ear saddle point, and the associated confidence level of the location, based on the generated heat map 1025. In implementations, a determination may be made as to whether the confidence level is greater than or equal to a threshold 1030. If so, then the 2D ear saddle point produced by the second model is used for further calculations. If not, the location of the true 3D ear saddle point may be determined by placing a jig on the subject and making calculations based on imagery produced by one or more cameras 1035, as discussed above. In embodiments, the comparison of the confidence level to a threshold may not be necessary, because the confidence level of the most probable 2D ear saddle point location may fall within an acceptable range under all practical conditions. The 2D ear saddle point, determined from the second model is projected onto the 3D mesh surface representing the subject's head 1040 along the axis perpendicular to the camera plane. The method 1000 may include determining a depth of a deepest point of the 3D mesh surface in a region around the projected 2D ear saddle point 1045. In implementations, the location of the 3D ear saddle point may be determined based on the projection of the 2D ear saddle point onto the 3D mesh and the determined depth 1050.

Figure 12:
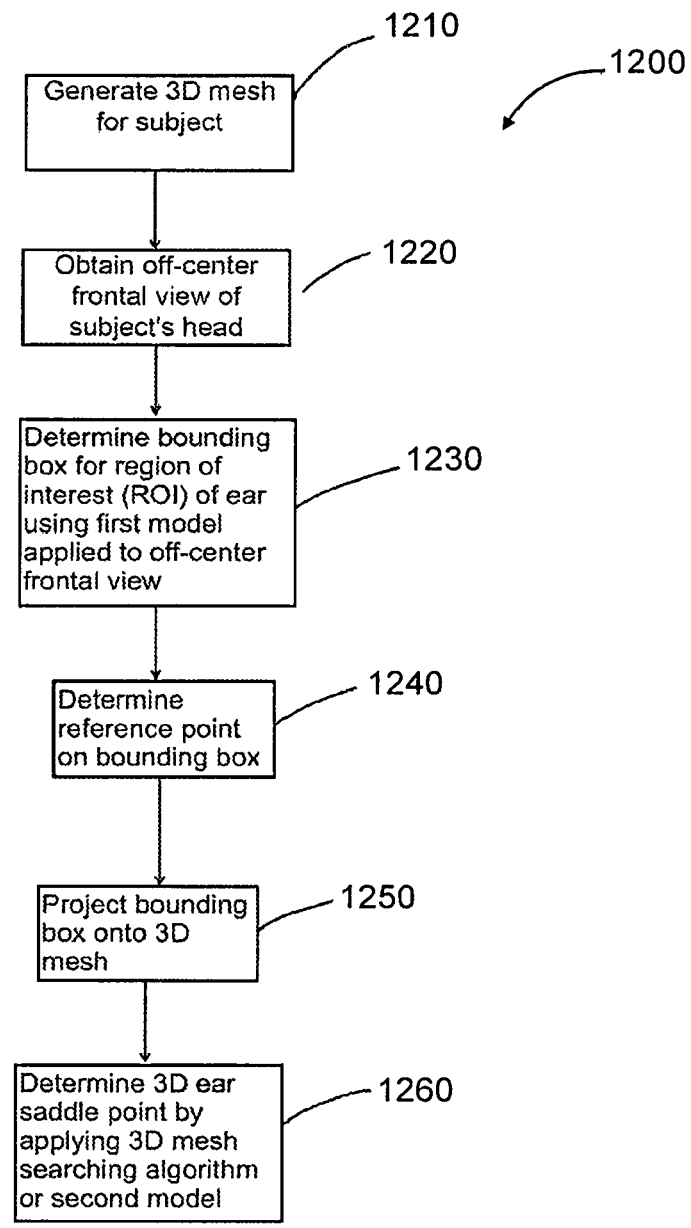
FIG. 12 shows a method using one or more models to determine 3D ear saddle point locations based on imaging data and a 3D mesh surface generated from the imaging data, according to one or more implementations.

FIG. 12 shows a method 1200 using one or more models to determine 3D ear saddle point locations based on imaging data 318, e.g., data for a plurality of images taken by a plurality of cameras 306 (see FIG. 3), and a 3D mesh surface generated from the imaging data 318. The method may include generating a 3D mesh surface representing at least a pertinent portion of the subject's head 1005, e.g., from imagery generated by one or more cameras, or other types of imaging equipment 1210. For example, in implementations, a first set 308 of the cameras 306 may be positioned in front of a subject, a second set 310 of the cameras 306 is located on a first side of the subject, and a third set 312 of cameras may be located on a second side of the subject opposite to the first side (see FIG. 3). In contrast to the embodiments discussed above (see, e.g., FIG. 11), separate profile camera perspective images of the subject's ears are not necessary. An off-center frontal view of the subject's head may be obtained 1220 from the cameras 306, e.g., from the second set 310 or the third set 312. The obtained off-center frontal view may come from the cameras 306 which are used to generate the 3D mesh surface and/or additional cameras, such as, for example, separate cameras which are co-located with the second set 310 or the third set 312 of cameras.

In implementations, a trained model, of one or more trained models, may be used to determine bounds of an ear, or a region of interest (ROI) of an ear, of the subject from off-center frontal view images 1230. The bounds, which may be in the form of a bounding shape, e.g., a bounding polygon or "bounding box". In implementations, the boundary may not have a specific geometric shape, i.e., it may be a boundary delineated by a line defining a free-form shape. A reference point may be determined on the bounding box to tie the bounding box to the coordinates of the 3D mesh surface. For example, an upper corner of the bounding box may be obtained by an algorithm which determines a point on the bounding box which is closest to the top and front of subject's head. The upper corner of the bounding box corresponds to an upper edge of the subject's ear, which may be used as a reference point for tying the bounding box to the coordinates of the 3D mesh surface. The bounding box may be projected onto the 3D mesh surface 1250 by first projecting the determined reference point onto a corresponding reference point on the 3D mesh surface.

A second model may be used to determine the most probable location of 3D ear saddle point on the 3D mesh surface, and the associated confidence level of the location, within the projected bounding box 1260, or around the region of the projected reference point. In embodiments, the searching algorithm may be used in lieu of, or in conjunction with, the second model to algorithmically search the area of the bounding box to locate one or more candidate locations of the 3D ear saddle point. For example, the algorithm may be used to determine reference points based on the "topography" of the subject's ear by locating ear edges, the ear canal, and other anatomical structures.

Figure 13:
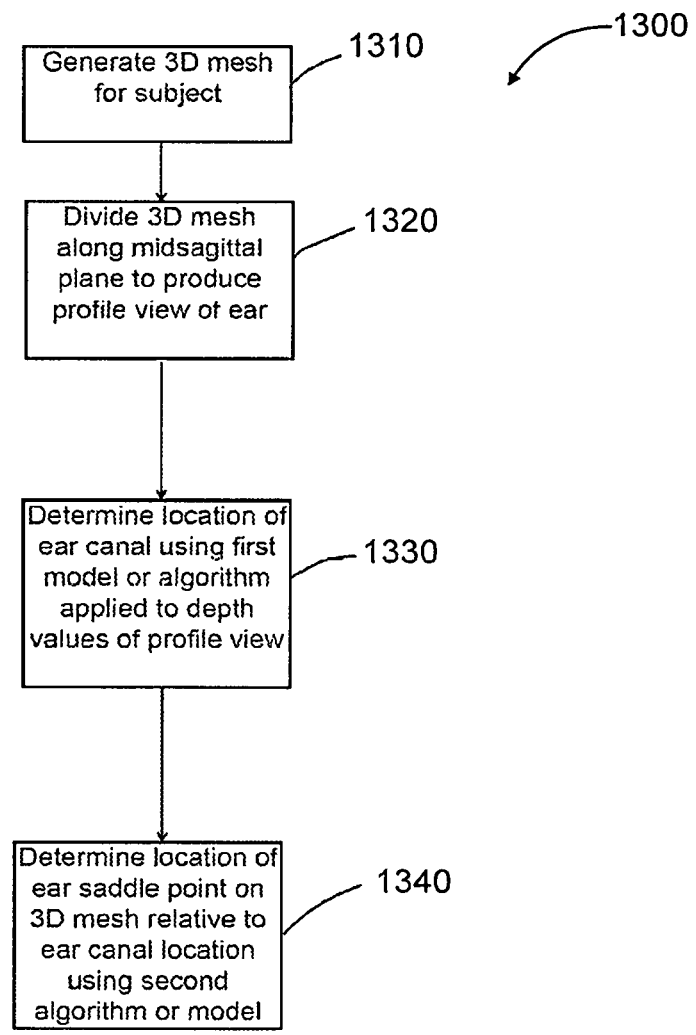
FIG. 13 shows a method using one or more models to determine 3D ear saddle point locations based on a 3D mesh surface generated from imaging data, according to one or more implementations.

FIG. 13 shows a method 1300 using one or more models to determine 3D ear saddle point locations based on a 3D mesh surface generated from imaging data. The method 1300 may include generating a 3D mesh surface representing at least a pertinent portion of the subject's head 1005, e.g., from imagery generated by one or more cameras, or other types of imaging equipment 1310. An algorithm may be used to split the 3D mesh surface along the midsagittal plane, which would correspond to a vertical plane between the eyes of the subject 1320. Each half of the split 3D mesh surface can be rotated to provide a profile view of the subject's head which includes the left or right ear of the subject. In implementations, an interior (or exterior) profile view may be used as a basis for determining the location of the ear saddle point. In such a case, a first model, and/or an algorithm, may be used determine locations of the ear canal based on depth values of points in the interior profile view derived from the 3D mesh surface 1330. For example, it is known that the ear canal will form the deepest portion of the 3D mesh surface and that the location of the ear canal will be in a central portion of the interior profile view. These conditions allow for the use of an algorithm alone, or in conjunction with the first model, to determine the ear canal location. A second model and/or algorithm may be used to determine the location of the ear saddle point relative to the determined ear canal location 1340. Because the ear canal locations can be determined relatively easily and with a high degree of certainty, making such a determination can simplify and improve the accuracy of a model and/or algorithm used to determine the location of the ear saddle point.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified. The various implementations described above can be combined to provide further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

What is claimed is:

1. A method of determining an ear saddle point of an ear of a subject to produce specifications to fit a wearable apparatus to a head of the subject, the method comprising:
   generating a three-dimensional mesh surface representing at least a portion of a surface of the head of the subject;
   obtaining a profile image of the ear of the subject;
   determining, using a first model, of one or more trained models, a boundary of the ear of the subject in the profile image;
   generating, using the first model, or a second model, a map of the ear of the subject indicating confidence levels of probable locations of a two-dimensional ear saddle point in a plane of the profile image;
   determining a most probable location of the two-dimensional ear saddle point, and a confidence level of the most probable location, based on the map;
   comparing the confidence level of the most probable location to a threshold;
   retrieving, if the confidence level of the most probable location is less than the threshold, a location of the ear saddle point determined based on measurements performed on the subject;
   performing, if the confidence level of the most probable location is greater than or equal to the threshold:
      projecting the two-dimensional ear saddle point onto the three-dimensional mesh surface,
      determining a maximum depth of the three-dimensional mesh surface in a defined region around the projected two-dimensional ear saddle point, and
      determining the ear saddle point based on the projected two-dimensional ear saddle point and the determined maximum depth; and
   generating specifications of a wearable apparatus to fit the wearable apparatus to the head of the subject based on the determined ear saddle point.

2. The method of claim 1, wherein the wearable apparatus is a wearable heads up display and the generated specifications comprise data regarding size of components of the wearable apparatus, including one or more of:
- dimensions of temple support portions;
- dimensions of a front frame of a support structure; and
- dimensions of a bridge.

3. The method of claim 1, wherein the three-dimensional mesh surface is generated from images from one or more cameras.

4. The method of claim 1, wherein the location of the ear saddle point based on measurements performed on the subject is determined by placing a jig on the subject and making calculations based on imagery produced by one or more cameras.

5. The method of claim 1, further comprising obtaining a profile image of an other ear of the subject and determining an ear saddle point location of the other ear.

6. The method of claim 1, wherein the maximum depth of the three-dimensional mesh surface in the defined region around the projected two-dimensional ear saddle point is measured along a transverse axis extending in a direction outward from the subject's head so as to be perpendicular to a plane of the profile view camera images.

7. The method of claim 1, wherein determining the ear saddle point based on the projected two-dimensional ear saddle point and the determined maximum depth comprises replacing a depth coordinate of the projected two-dimensional ear saddle point with a value corresponding to the determined maximum depth of the three-dimensional mesh surface in the defined region around the projected two-dimensional ear saddle point.

8. The method of claim 1, wherein the first model performs object recognition using a neural network model or computer vision algorithm.

9. The method of claim 1, further comprising generating a data set of two-dimensional ear saddle points to train at least one of the first model or the second model.

10. The method of claim 9, wherein the generating of the data set of two-dimensional ear saddle points comprises:
- placing a jig having one or more target markers on the head of the subject, the jig having a known geometry which comprises positions of portions of the jig which are in contact with one or more ear saddle points of the subject;
- detecting positions of the one or more target markers;
- computing three-dimensional ear saddle points based on the detected positions of the one or more target markers and the known geometry of the jig; and
- computing two-dimensional ear saddle points by projecting the computed three-dimensional ear saddle points onto a profile plane.

11. A method of determining an ear saddle point of an ear of a subject to produce specifications to fit a wearable apparatus to a head of the subject, the method comprising:
- generating a three-dimensional mesh surface representing at least a portion of a surface of the head of the subject;
- obtaining an off-center frontal image of the head of the subject;
- determining, using a first model, of one or more trained models, a boundary of an ear region of the subject in the off-center frontal image;
- determining a reference point on the boundary to tie the boundary to coordinates of the three-dimensional mesh surface;
- projecting the boundary onto the three-dimensional mesh surface by projecting the determined reference point of the boundary onto a corresponding reference point on the three-dimensional mesh surface;
- determining, using the first model, or a second model, the ear saddle point on the three-dimensional mesh surface within the projected boundary; and
- generating specifications of a wearable apparatus to fit the wearable apparatus to the head of the subject based on the determined ear saddle point.

12. The method of claim 11, further comprising determining a confidence level associated with the determining of the ear saddle point.

13. The method of claim 11, wherein the reference point is a point on the boundary which is closest to the top and front of the head of the subject.

14. The method of claim 11, wherein the wearable apparatus is a wearable heads up display and the generated specifications comprise data regarding size of components of the wearable apparatus, including one or more of:
- dimensions of temple support portions;
- dimensions of a front frame of a support structure; and
- dimensions of a bridge.

15. A method of determining an ear saddle point of an ear of a subject to produce specifications to fit a wearable apparatus to a head of the subject, the method comprising:
- generating a three-dimensional mesh surface representing at least a portion of a surface of the head of the subject;
- dividing the three-dimensional mesh surface along a midsagittal plane to produce at least one profile view of the head of the subject;
- determining a location of an ear canal based on depth coordinates of points on the three-dimensional mesh surface in the profile view, the depth coordinates being measured along a transverse axis extending in a direction perpendicular to the midsagittal plane;
- determining, using a trained model and the determined location of the ear canal, the ear saddle point on the three-dimensional mesh surface; and
- generating specifications of a wearable apparatus to fit the wearable apparatus to the head of the subject based on the determined ear saddle point.

16. The method of claim 15, wherein the apparatus is a wearable heads up display and the generated specifications comprise data regarding size of components of the wearable apparatus, including one or more of:
- dimensions of temple support portions;
- dimensions of a front frame of a support structure; and
- dimensions of a bridge.

* * * * *